US012701581B2

(12) United States Patent
Matsumura et al.

(10) Patent No.: US 12,701,581 B2
(45) Date of Patent: Aug. 4, 2026

(54) TERMINAL AND COMMUNICATION METHOD

(71) Applicant: NTT DOCOMO, INC., Tokyo (JP)

(72) Inventors: Yuki Matsumura, Tokyo (JP); Shohei Yoshioka, Tokyo (JP); Shinya Kumagai, Tokyo (JP); Yuki Takahashi, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 317 days.

(21) Appl. No.: 18/567,309

(22) PCT Filed: Jul. 2, 2021

(86) PCT No.: PCT/JP2021/025222
§ 371 (c)(1),
(2) Date: Dec. 5, 2023

(87) PCT Pub. No.: WO2023/276164
PCT Pub. Date: Jan. 5, 2023

(65) Prior Publication Data
US 2024/0267927 A1      Aug. 8, 2024

(51) Int. Cl.
*H04W 72/231* (2023.01)
*H04L 5/00* (2006.01)
*H04W 52/32* (2009.01)

(52) U.S. Cl.
CPC ......... *H04W 72/231* (2023.01); *H04L 5/0098* (2013.01); *H04W 52/325* (2013.01)

(58) Field of Classification Search
None
See application file for complete search history.

(56) References Cited

U.S. PATENT DOCUMENTS

| | | | |
|---|---|---|---|
| 2019/0289513 A1* | 9/2019 | Jeon ................. | H04W 72/0453 |
| 2021/0258894 A1* | 8/2021 | Yao ........................ | H04W 72/23 |
| 2022/0183060 A1* | 6/2022 | Li ...................... | H04W 72/0453 |
| 2023/0079660 A1* | 3/2023 | Fu .......................... | H04L 5/0053 |
| | | | 370/329 |
| 2024/0121062 A1* | 4/2024 | Salah .................... | H04L 1/1854 |
| 2024/0267927 A1* | 8/2024 | Matsumura ........... | H04W 72/21 |

OTHER PUBLICATIONS

Office Action issued in Japanese Patent Application No. 2023-531339, dated Jun. 10, 2025 (6 pages).

(Continued)

*Primary Examiner* — Hassan A Phillips
*Assistant Examiner* — Gautam Sharma
(74) *Attorney, Agent, or Firm* — Osha Bergman Watanabe & Burton LLP

(57) ABSTRACT

A terminal includes: a reception unit configured to receive control information and data from a base station; a control unit configured to determine a carrier for transmitting an uplink control channel, based on the control information; and a transmission unit configured to transmit information related to retransmission control of the data in the determined carrier. The control unit configures an activation timing and a deactivation timing of the determined carrier.

4 Claims, 35 Drawing Sheets

(56)           References Cited

OTHER PUBLICATIONS

3GPP TSG RAN WG1 Meeting #105-e; R1-2104326; ZTE; "Discussion on HARQ-ACK enhancements for eURLLC"; e-Meeting, May 10-27, 2021 (10 pages).

International Search Report issued in PCT/JP2021/025222 on Jan. 25, 2022 (3 pages).

Written Opinion of the International Searching Authority issued in PCT/JP2021/025222 on Jan. 25, 2022 (3 pages).

China Telecom; "Discussion on two aspects of UE HARQ-ACK feedback enhancements"; 3GPP TSG RAN WG1 #105-e, R1-2104854; e-Meeting; May 10-27, 2021 (7 pages).

MediaTek Inc .; "On UE feedback enhancements for HARQ-ACK"; 3GPP TSG RAN WG1 Meeting #104-e, R1-2100574; e-Meeting; Jan. 25-Feb. 5, 2021 (19 pages).

3GPP TS 38.300 V16.4.0; "3rd Generation Partnership Project; Technical Specification Group Radio Access Network; NR; NR and NG-RAN Overall Description; Stage 2 (Release 16)"; Dec. 2020 (149 pages).

Nokia, Nokia Shanghai Bell; "Revised WID: Enhanced Industrial Internet of Things (IoT) and ultra-reliable and low latency communication (URLLC) support for NR"; 3GPP TSG RAN Meeting #88e, RP-201310; Electronic meeting; Jun. 29-Jul. 3, 2020 (6 pages).

* cited by examiner

FIG.1

SWITCHING ACCORDING TO RRC AND/OR MAC CE AND/OR DCI

MAC CE STRUCTURE

| Cell group index | | | | | | | |
|---|---|---|---|---|---|---|---|
| R | R | R | R | $C_3$ | $C_2$ | $C_1$ | $C_0$ |
| $C_7$ | $C_6$ | $C_5$ | $C_4$ | | | | |

TERMINAL AND COMMUNICATION METHOD

FIELD OF THE INVENTION

The present invention relates to a terminal and a communication method in a wireless communication system.

BACKGROUND OF THE INVENTION

In 3GPP (3rd Generation Partnership Project), in order to realize further larger system capacity, further faster data transmission speed, further lower latency in a wireless communication section, etc., a wireless communication method called "5G" or "NR (New Radio)" has been discussed (hereinafter, the wireless communication method is referred to as "NR"). In 5G, various wireless technologies and network architectures are being discussed to satisfy the requirement of a radio link delay of 1 ms or less while achieving throughput of 10 Gbps or more (e.g., non-patent document 1).

Furthermore, in the 3GPP standardization, PUCCH (Physical Uplink Control Channel) carrier switching is being discussed for the extension of URLLC (Ultra-Reliable and Low Latency Communications) technology. For example, the PUCCH carrier switching has been discussed as a method of reducing the latency of HARQ-ACK (Hybrid Automatic Repeat Request-Acknowledgement) feedback in the TDD (Time Division Duplex) scheme (e.g., non-patent document 2).

CITATION LIST

Non-Patent Document

Non-Patent Document 1: 3GPP TS 38.300 V16.4.0 (2020-12)

Non-Patent Document 2: 3GPP TSG RAN Meeting #88e, RP-201310, Electronic meeting, Jun. 29-Jul. 3, 2020

SUMMARY OF THE INVENTION

Technical Problem

In a case where the PUCCH transmission cell is extended to be a secondary cell other than the primary cell, the primary secondary cell group cell, or the PUCCH secondary cell, when performing the PUCCH carrier switching, the configuration related to PUCCH transmission in the transition-destination carrier has been unclear.

The present invention has been made in view of the above points, and it is an object of the present invention to clarify the configuration related to uplink control channel transmission in a wireless communication system.

Solution to Problem

According to the disclosed technology, a terminal is provided. The terminal includes: a reception unit configured to receive control information and data from a base station; a control unit configured to determine a carrier for transmitting an uplink control channel, based on the control information; and a transmission unit configured to transmit information related to retransmission control of the data in the determined carrier. The control unit configures an activation timing and a deactivation timing of the determined carrier.

Advantageous Effects of Invention

According to the disclosed technique, the configuration related to uplink control channel transmission in a wireless communication system is clarified.

BRIEF DESCRIPTION OF THE DRAWINGS

FIG. 1 is a drawing illustrating an example (1) of a wireless communication system according to an embodiment of the present invention.

FIG. 10 is a drawing illustrating an example (7) of PUCCH transmission in an embodiment of the present invention.

FIG. 11 is a drawing illustrating an example of MAC-CE in an embodiment of the present invention.

FIG. 12 is a drawing illustrating an example (8) of PUCCH transmission in an embodiment of the present invention.

FIG. 22 is a drawing illustrating an example (5) of PUCCH transmission power control in an embodiment of the present invention.

FIG. 26 is a drawing illustrating an example (2) of UCI multiplexing in an embodiment of the present invention.

FIG. 27 is a drawing illustrating an example (3) of UCI multiplexing in an embodiment of the present invention.

FIG. 28 is a drawing illustrating an example (4) of UCI multiplexing in an embodiment of the present invention.

DETAILED DESCRIPTION OF THE PREFERRED EMBODIMENTS

Figure 2:
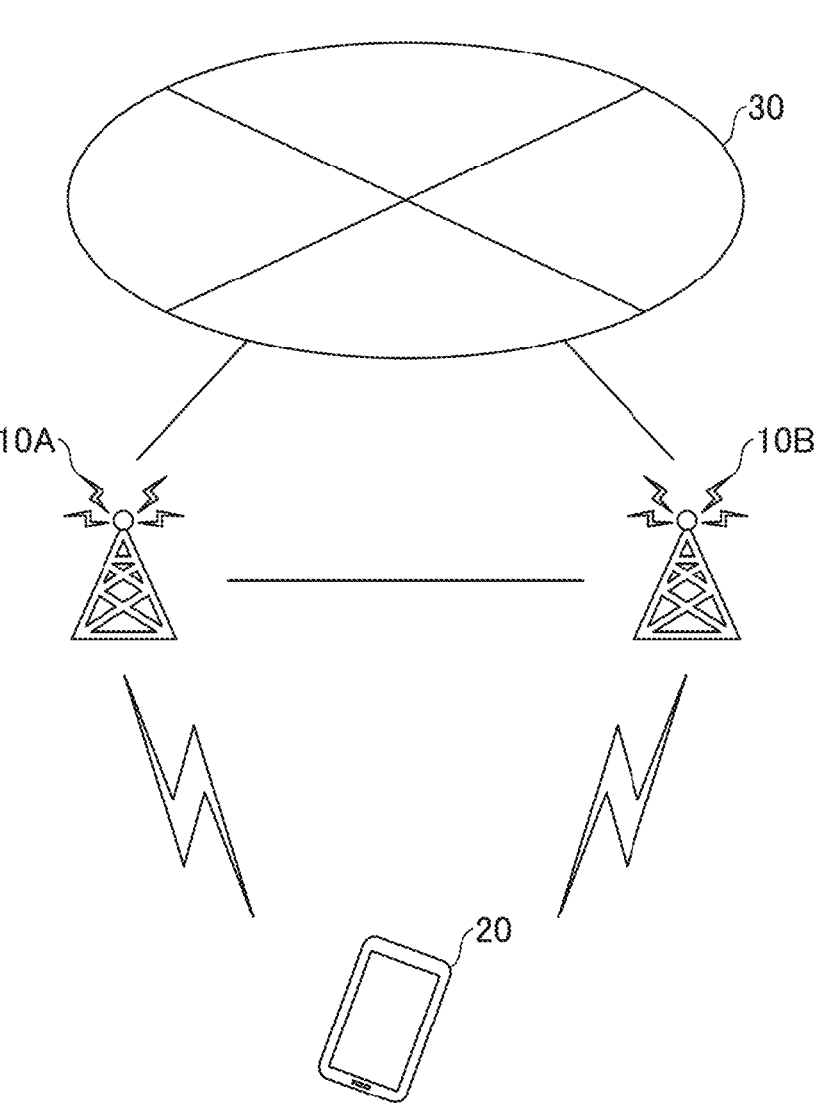
FIG. 2 is a drawing illustrating an example (1) of a wireless communication system according to an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used accordingly. The conventional techniques include, but are not limited to, conventional NR or LTE, for example.

Figure 1:
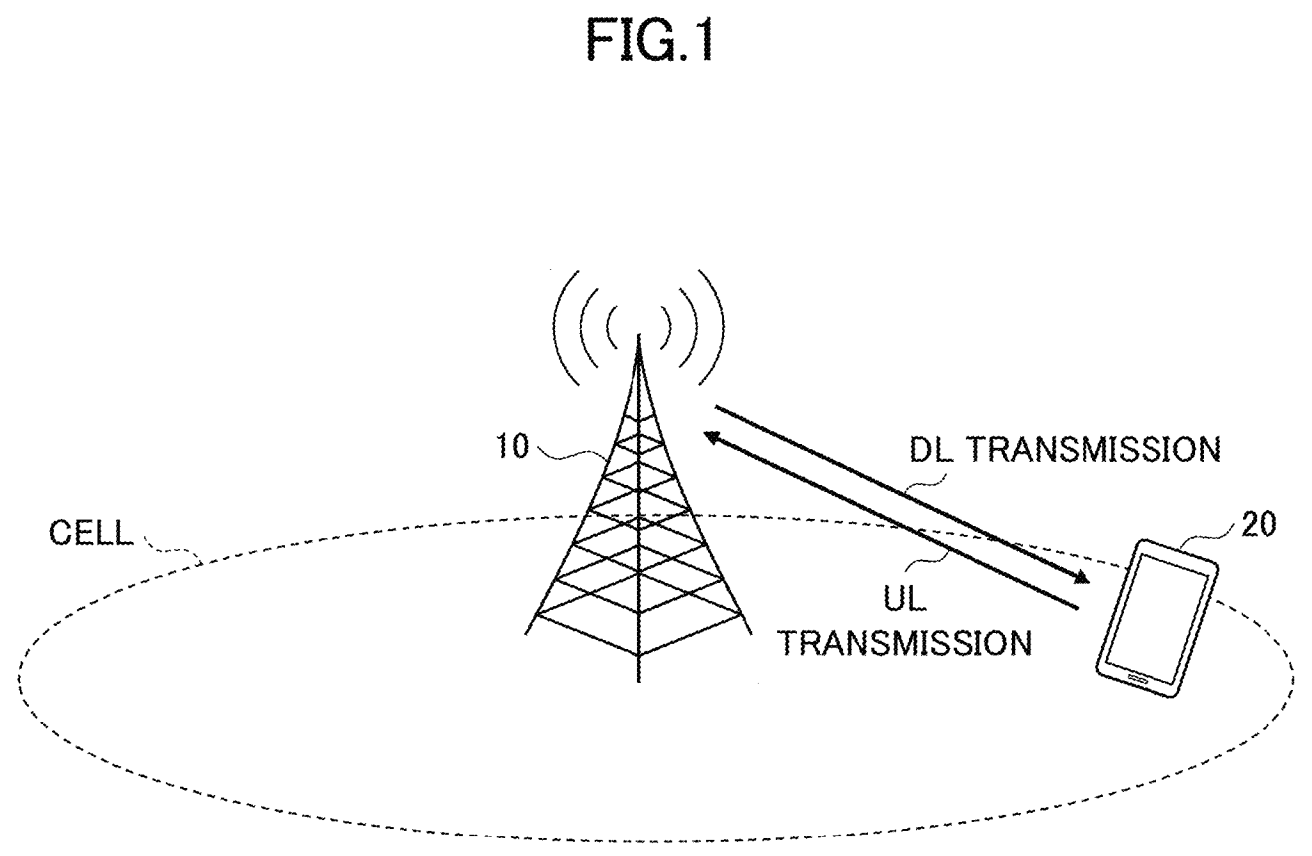

FIG. 1 is a drawing illustrating an example (1) of a wireless communication system according to an embodiment of the present invention. As illustrated in FIG. 1, a wireless communication system according to an embodiment of the present invention includes a base station 10 and a terminal 20. In FIG. 1, a single base station 10 and a single terminal 20 are illustrated as an example. There may be a plurality of base stations 10 and a plurality of terminals 20.

The base station 10 is a communication device that provides one or more cells and performs wireless communications with the terminal 20. Physical resources of the radio signal may be defined in the time domain and the frequency domain, the time domain may be defined by the number of OFDM symbols, and the frequency domain may be defined by the number of sub-carriers or resource blocks. Further, a TTI (Transmission Time Interval) in the time domain may be a slot, or the TTI may be a subframe.

The base station 10 can perform carrier aggregation (CA: Carrier Aggregation) to communicate with the terminal 20 by bundling a plurality of cells (multiple CCs (component carriers)). In the carrier aggregation, one PCell (Primary Cell) and one or more SCells (Secondary Cells) are used.

The base station 10 transmits a synchronization signal, system information, and the like, to the terminal 20. The synchronization signal is, for example, an NR-PSS and an NR-SSS. The system information may be transmitted via a NR-PBCH or a PDSCH, for example, and may be referred to as broadcast information. As shown in FIG. 1, the base station 10 transmits a control signal or data in DL (Downlink) to the terminal 20 and receives a control signal or data in UL (Uplink) from the terminal 20. Note that, here, what is transmitted via a control channel such as PUCCH (Physical Uplink Shared Channel) and PDCCH (Physical Downlink Control Channel) is called a control signal, and what is transmitted via a shared channel such as PUSCH (Physical Uplink Shared Channel) and PDSCH (Physical Downlink Shared Channel) is called data. However, these names are examples.

The terminal 20 may be a communication apparatus that includes a wireless communication function such as a smartphone, a mobile phone, a tablet, a wearable terminal, a communication module for M2M (Machine-to-Machine), or the like. As shown in FIG. 1, the terminal 20 uses various communication services provided by the wireless communication system by receiving control signals or data in DL from the base station 10 and transmitting control signals or data in UL to the base station 10. Note that the terminal 20 may be referred to as a UE, and the base station 10 may be referred to as a gNB.

FIG. 2 is a drawing illustrating an example (2) of a wireless communication system according to an embodiment of the present invention. FIG. 2 illustrates an example of a configuration of a wireless communication system in a case where dual connectivity (DC) is performed. As shown in FIG. 2, a base station 10A serving as a Master Node (MN) and a base station 10B serving as a Secondary Node (SN) are provided. The base station 10A and the base station 10B are each connected to a core network 30. The terminal 20 is enabled to communicate with both the base station 10A and the base station 10B.

A cell group provided by the base station 10A serving as an MN is called a Master Cell Group (MCG), and a cell group provided by the base station 10B serving as an SN is called a Secondary Cell Group (SCG). In addition, in the dual connectivity, the MCG includes one PCell and zero or more SCells, and the SCG includes one PSCell (Primary SCG Cell) and zero or more SCells. PCell or PSCell may be described as SpCell (Special Cell).

The dual connectivity may be a communication method using two communication standards, and any communication standards may be combined. For example, the combination may be NR and 6G standards, or may be LTE and 6G standards. In addition, the dual connectivity may be a communication method using three or more communication standards and may be referred to as another name different from the dual connectivity.

Processing operations in this embodiment may be performed in a system configuration shown in FIG. 1, in a system configuration shown in FIG. 2, or in other system configurations.

In the 3GPP (Registered Trademark) standardization, supporting the enhanced IoT (Internet of Things) and URLLC (Ultra-Reliable and Low Latency Communication) in NR has been discussed. In addition, enhancement of HARQ-ACK feedback is being discussed to address URLLC requirements. For example, the PUCCH carrier switching has been discussed in order to improve latency of HARQ-ACK feedback.

Here, the PUCCH resource is configured in PCell, PSCell, or PUCCH-SCell. The terminal was unable to transmit PUCCH in a cell other than PCell, PSCell, or PUCCH-SCell. Which cell is to be used for transmitting PUCCH is specified in advance, and thus, it was difficult to flexibly change the cell used for transmitting PUCCH.

For example, the following configuration is assumed.

PUCCH group 1: CC0=PCell, CC1=SCell
PUCCH group 2: CC2=PUCCH-SCell, CC3=SCell

Here, in a case of PUCCH group 1, PUCCH can be transmitted only by using CC0, and PUCCH cannot be transmitted by using CC1. In a case of PUCCH group 2, PUCCH can be transmitted only by using CC2, and PUCCH cannot be transmitted by using CC3. In addition, PUCCH-SCell cannot be configured in the intra-band CA, and thus, it was difficult to flexibly change which CC is to be used for transmitting PUCCH in the intra-band.

Therefore, which CC is to be used for transmitting PUCCH may be specified by flexibly selecting the CC for transmitting PUCCH. For example, PUCCH carrier switching based on a dynamic indication according to the PUCCH scheduling DCI (Downlink Control Information) may be supported. In addition, for example, PUCCH carrier switching based on the semi-static configuration may be supported. The PUCCH carrier switching may mean switching of the carrier, CC, or cell for transmitting PUCCH.

For example, the semi-static configuration may be based on the PUCCH cell timing pattern configured by RRC (Radio Resource Control), or PUCCH carrier switching between cells that have different numerologies or subcarrier spacings may be supported. The PUCCH cell may be a cell that is available for transmitting PUCCH.

In addition, the maximum number of PUCCH cells may be specified. In addition, the dynamic configuration and the semi-static configuration may be integrated to be applied to the PUCCH carrier switching. In addition, the PUCCH carrier switching and the SPS (Semi-persistent) HARQ-ACK postponement may be integrated to be applied.

Figure 3:
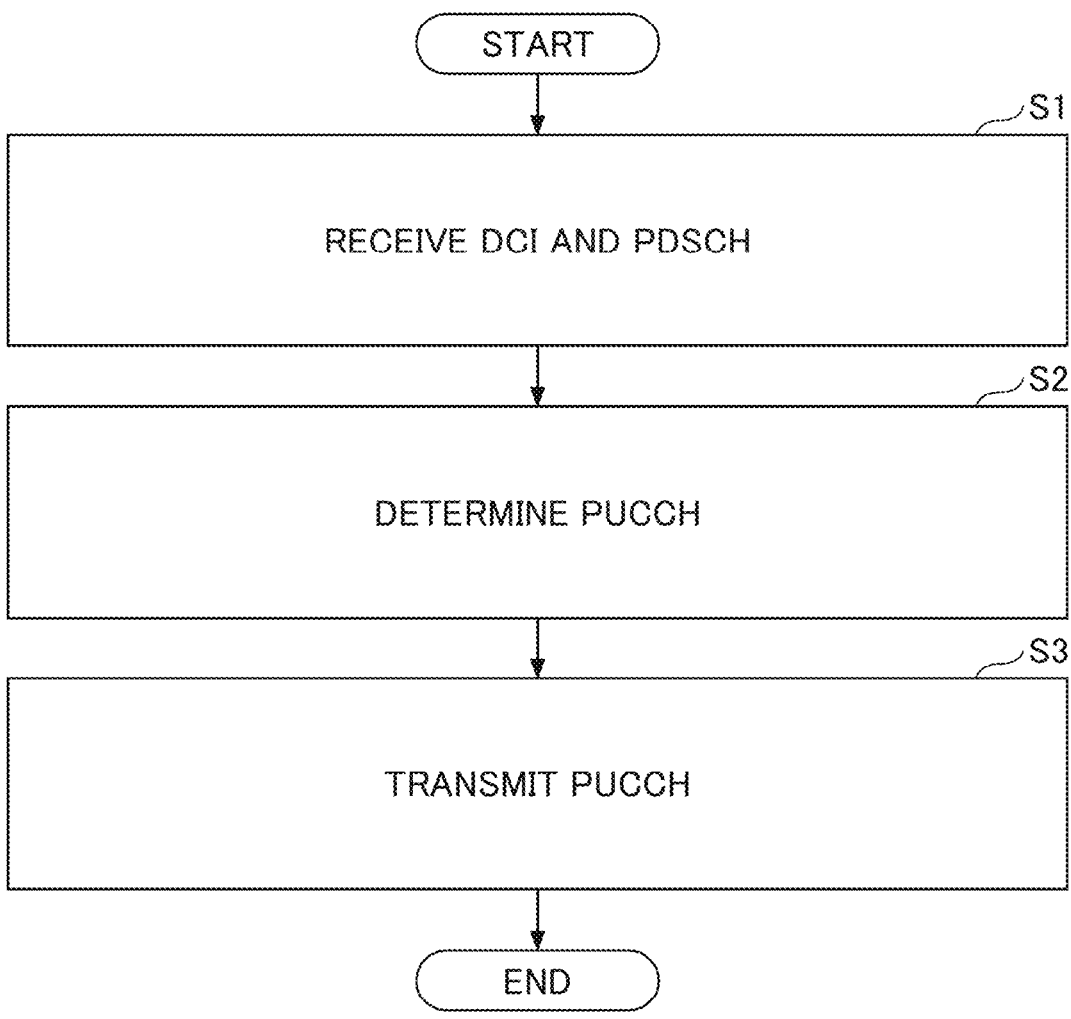
FIG. 3 is a flowchart illustrating an example of PUCCH transmission in an embodiment of the present invention.

FIG. 3 is a flowchart illustrating an example of PUCCH transmission in an embodiment of the present invention. In step S1, the terminal 20 receives DCI and PDSCH from the base station 10. In subsequent step S2, the terminal 20 determines PUCCH for transmitting HARQ-ACK corresponding to the received PDSCH. The terminal 20 may determine the cell or carrier for transmitting PUCCH, the resource for transmitting PUCCH, and the transmission power for transmitting PUCCH, based on control information received from the base station 10. The control information may be, for example, RRC, MAC-CE, and/or DCI. Hereinafter, RRC, MAC-CE, and DCI may be replaced with each other. In subsequent step S3, the terminal 20 transmits the determined PUCCH to the base station 10.

For example, the base station 10 may indicate the PUCCH transmission CC by using RRC, MAC-CE (Medium Access Control-Control Element), or DCI. The terminal 20 may transmit PUCCH by using the indicated CC.

For example, the switching between PUCCH #1 transmitted by PCell or PSCell and PUCCH #2 transmitted by PUCCH-SCell may be performed according to RRC, MAC-CE, or DCI.

Figure 4:
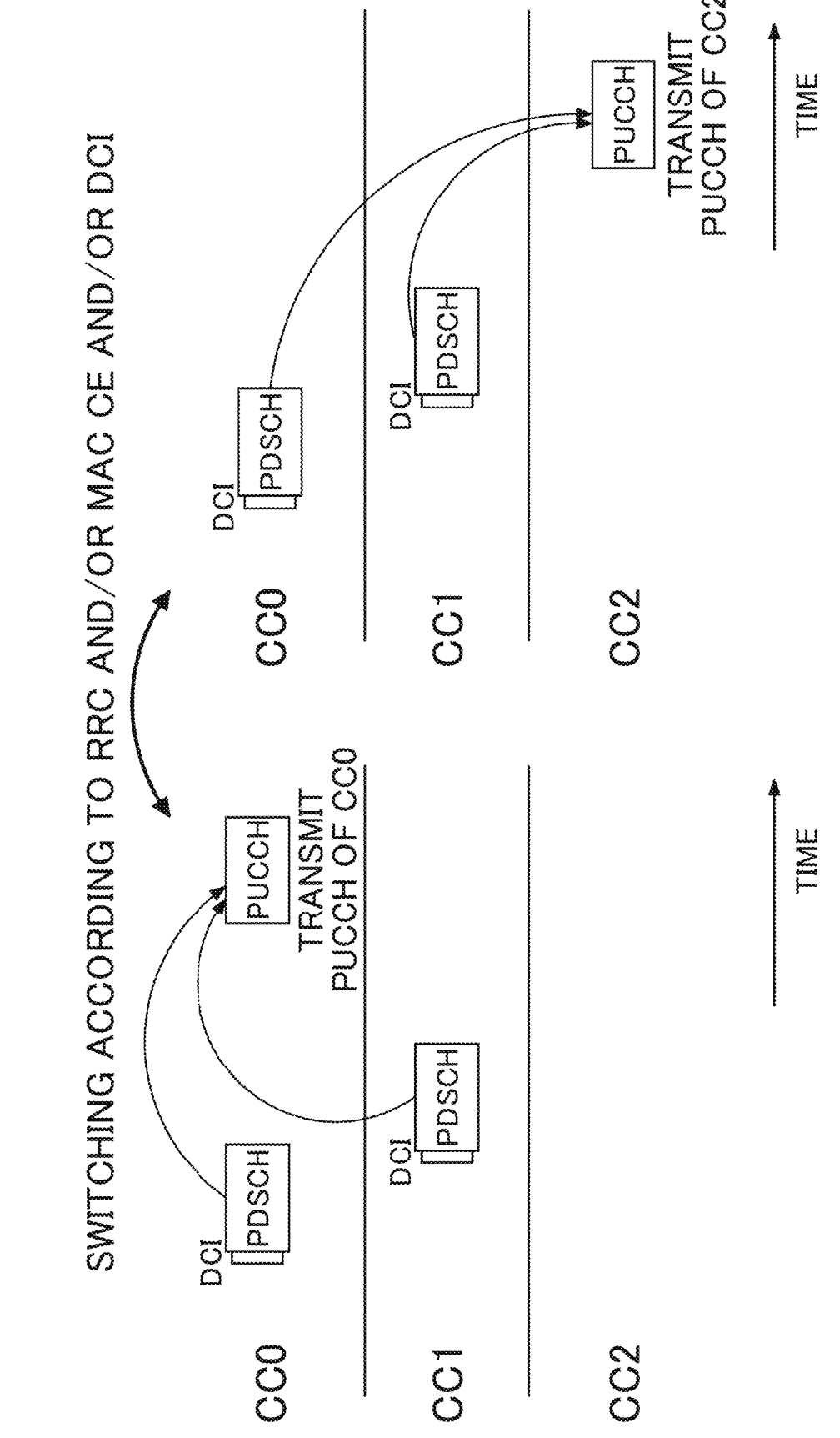
FIG. 4 is a drawing illustrating an example (1) of PUCCH transmission in an embodiment of the present invention.

FIG. 4 is a drawing illustrating an example (1) of PUCCH transmission in an embodiment of the present invention. The switching of PUCCH transmission CC may be indicated by RRC, MAC-CE, and/or DCI without limiting the CC to PCell, PSCell or PUCCH-SCell as illustrated in FIG. 4. For example, the PUCCH transmission CC may be indicated by RRC, MAC-CE, and/or DCI from among all the configured CCs. In addition, for example, one or more CC lists including some of all the configured CCs may be selected or configured in advance, and the PUCCH transmission CC may be indicated by RRC, MAC-CE, and/or DCI from among CCs included in the selected or configured CC lists.

One or more predetermined lists including some of CCs among all the configured CCs may be selected or configured based on a predetermined rule. For example, with respect to the predetermined rule, one list may include a predetermined number of CCs with CCIDs from the smallest CCID. The predetermined number may be specified by the technical specifications, may be configured by an upper layer, or may be indicated from the terminal 20 to the base station 10 according to the UE capability report.

In addition, for example, the one or more predetermined CC lists including some CCs among all the configured CCs may be configured by an upper layer. The configurable maximum number of CCs per CC list may be indicated from the terminal 20 to the base station 10 according to the UE capability report.

Note that, with respect to the PUCCH carrier switching, the following cases of 1) and 2) may be both assumed.

1) A case in which the PUCCH transmission carrier is dynamically indicated.
2) A case in which the PUCCH transmission carrier is semi-statically indicated. For example, a case in which the PUCCH carrier switching is performed only in a case where PUCCH cannot be transmitted by using a PUCCH transmission slot indicated by the HARQ feedback timing indicator.

When PUCCH is transmitted as described above, the degree of congestion of UE resources is different for each CC, and thus, the resource distribution is enabled. In addition, there may be a case in which the TDD configuration is different for each CC, and thus, PUCCH can be transmitted at a more flexible timing.

Figure 5:
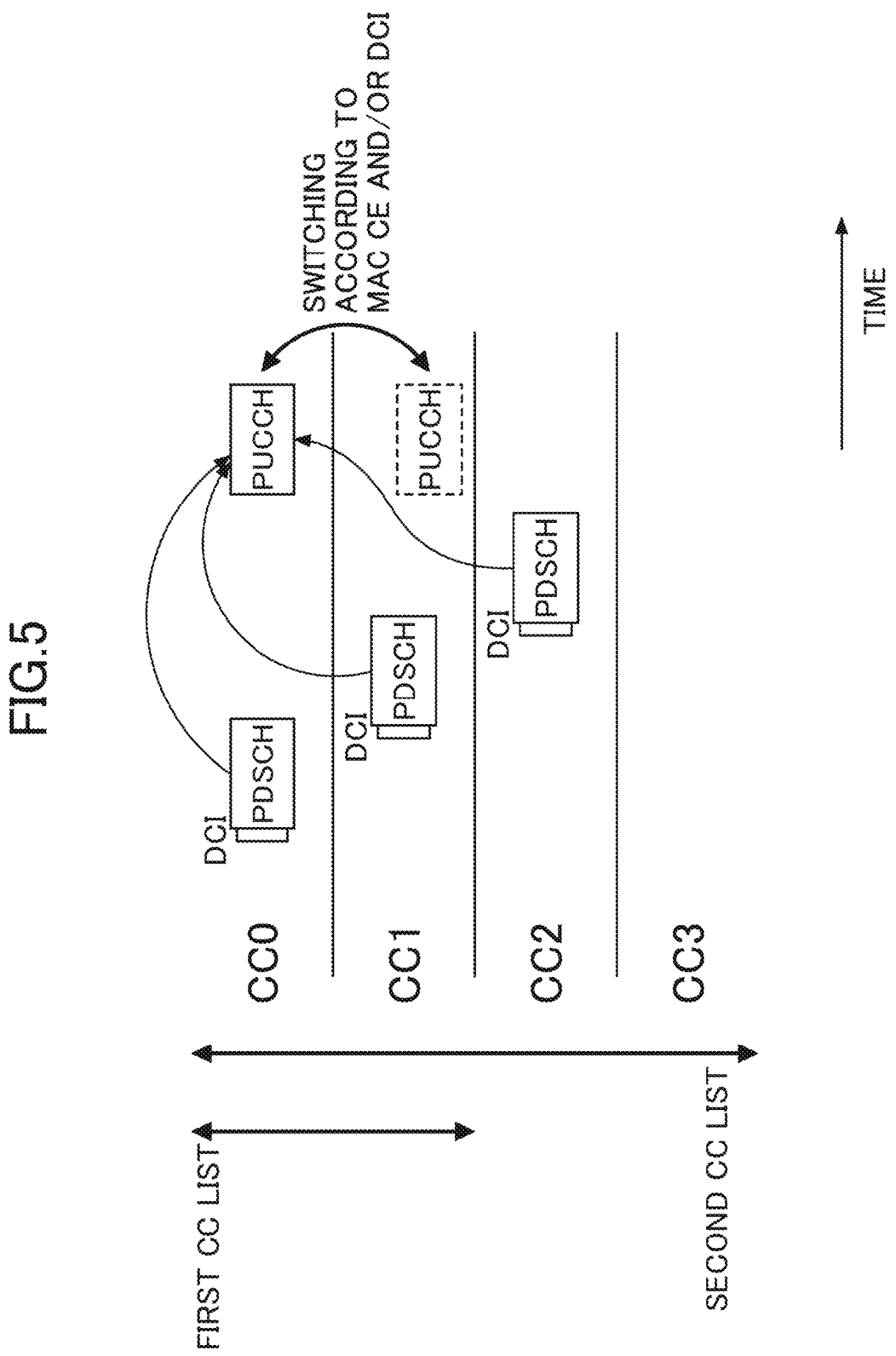
FIG. 5 is a drawing illustrating an example (2) of PUCCH transmission in an embodiment of the present invention.

FIG. 5 is a drawing illustrating an example (2) of PUCCH transmission in an embodiment of the present invention. A CC for PUCCH for transmitting UCIs together may be indicated or selected from predetermined CC candidates, for example, from the first CC list illustrated in FIG. 5 by using MAC-CE and/or DCI. The CC candidates that can be indicated by MAC-CE and/or DCI can be limited by configuring or specifying the first CC list, and thus, the signaling overhead can be reduced and the UE complexity can be reduced.

In addition, as illustrated in FIG. 5, the second CC list may be indicated, or is not required to be indicated, from the base station 10 to the terminal 20, the second CC list being for indicating UCIs of which CC (for example, HARQ, CSI, or the like) is to be transmitted together by PUCCH. In a case where the second list is not indicated, the terminal 20 may transmit UCIs of all CCs together by PUCCH. The all CCs may be all CCs including SpCell and SCell, or may be all CCs in the PUCCH cell group.

Figure 6:
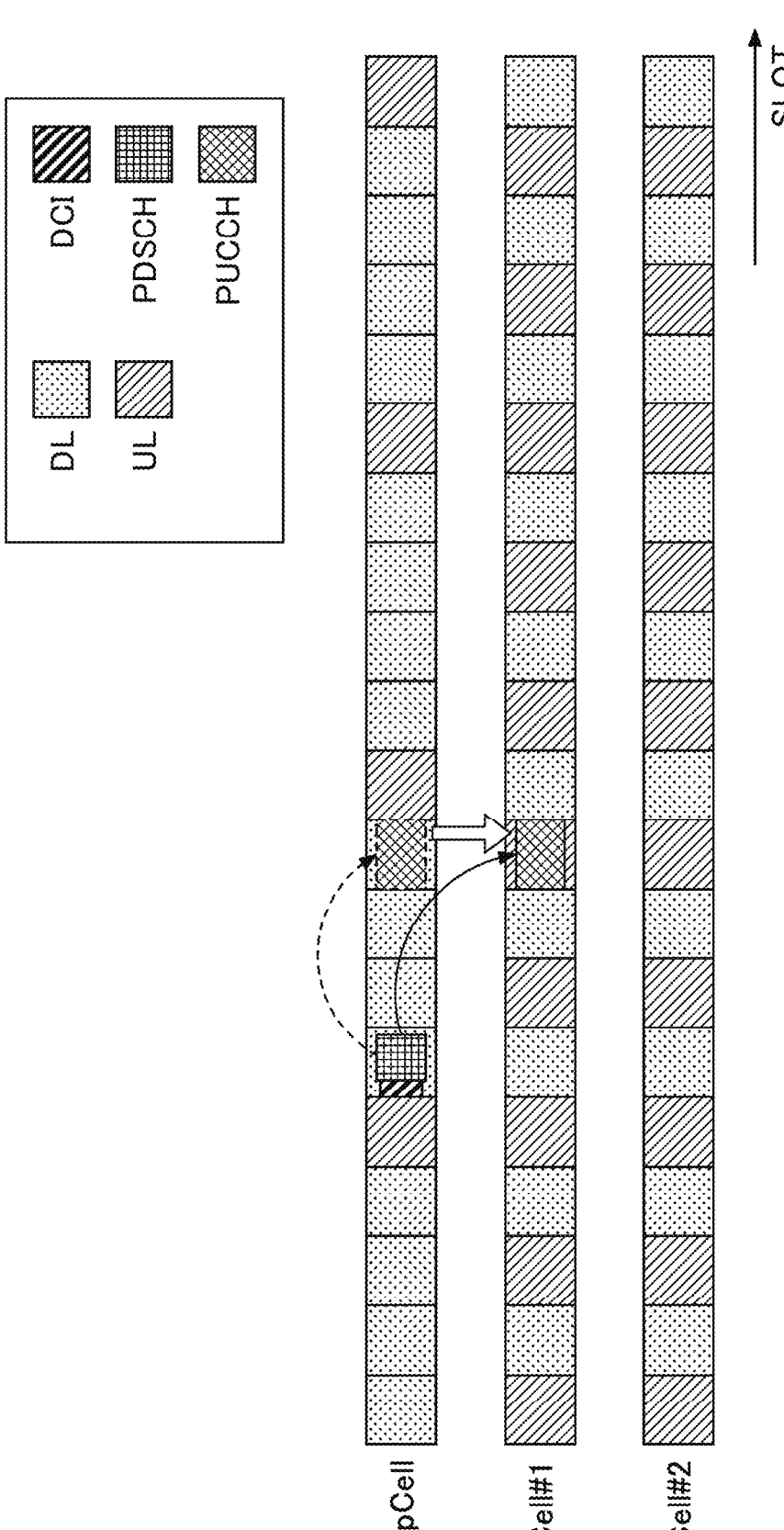
FIG. 6 is a drawing illustrating an example (3) of PUCCH transmission in an embodiment of the present invention.

FIG. 6 is a drawing illustrating an example (3) of PUCCH transmission in an embodiment of the present invention. As illustrated in FIG. 6, there is a case in which the TDD configuration is different for each CC. In a case where a slot indicated as the HARQ timing is DL, if there is UL in another CC in the slot, the HARQ latency can be improved as compared with the conventional way by transmitting HARQ-ACK in the another CC, and thus, the URLLC performance can be improved.

For example, as illustrated in FIG. 6, in a case where a slot indicated by the HARQ feedback timing indicator (PDSCH to HARQ feedback timing indicator) included in DCI is unavailable in SpCell for transmitting PUCCH, the PUCCH transmission CC may be switched to SCell #1. The condition of unavailability of the slot may be, for example, that the slot is a DL slot, that a UL symbol of PUCCH is unavailable in the special subframe, or that the slot is a UL slot that has already been allocated to another channel.

In an embodiment of the present invention, even in a case where there is no indication of PUCCH carrier switching according to MAC-CE or DCI, the PUCCH transmission CC can be switched by pre-configuring the PUCCH transmission CCs via RRC or by searching, by the terminal 20, for an available CC. In addition, PUCCH may be transmitted in a slot that is the same as a slot indicated by the HARQ feedback timing indicator or in a slot overlapping with at least a part of a slot of different SCS. In a case where a plurality of CCs are available, the priority order may be specified or configured in advance to the CCs. For example, a CC with a smaller CC index may be prioritized to be used for transmitting PUCCH. The switchable PUCCH transmission CC candidates may be configured by an upper layer in advance. According to the above configuration, it is possible to prevent PUCCH from being transmitted using a CC that is not desired by the terminal 20.

Figure 7:
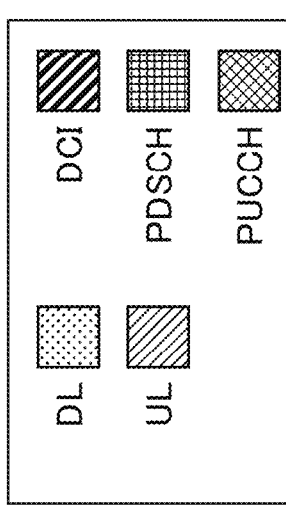
FIG. 7 is a drawing illustrating an example (4) of PUCCH transmission in an embodiment of the present invention.
Figure 7:
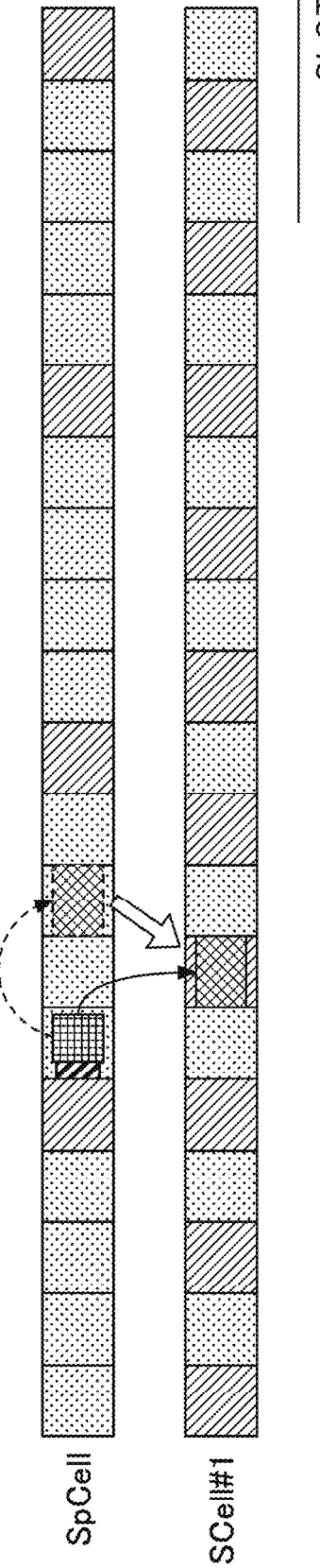
Figure 8:
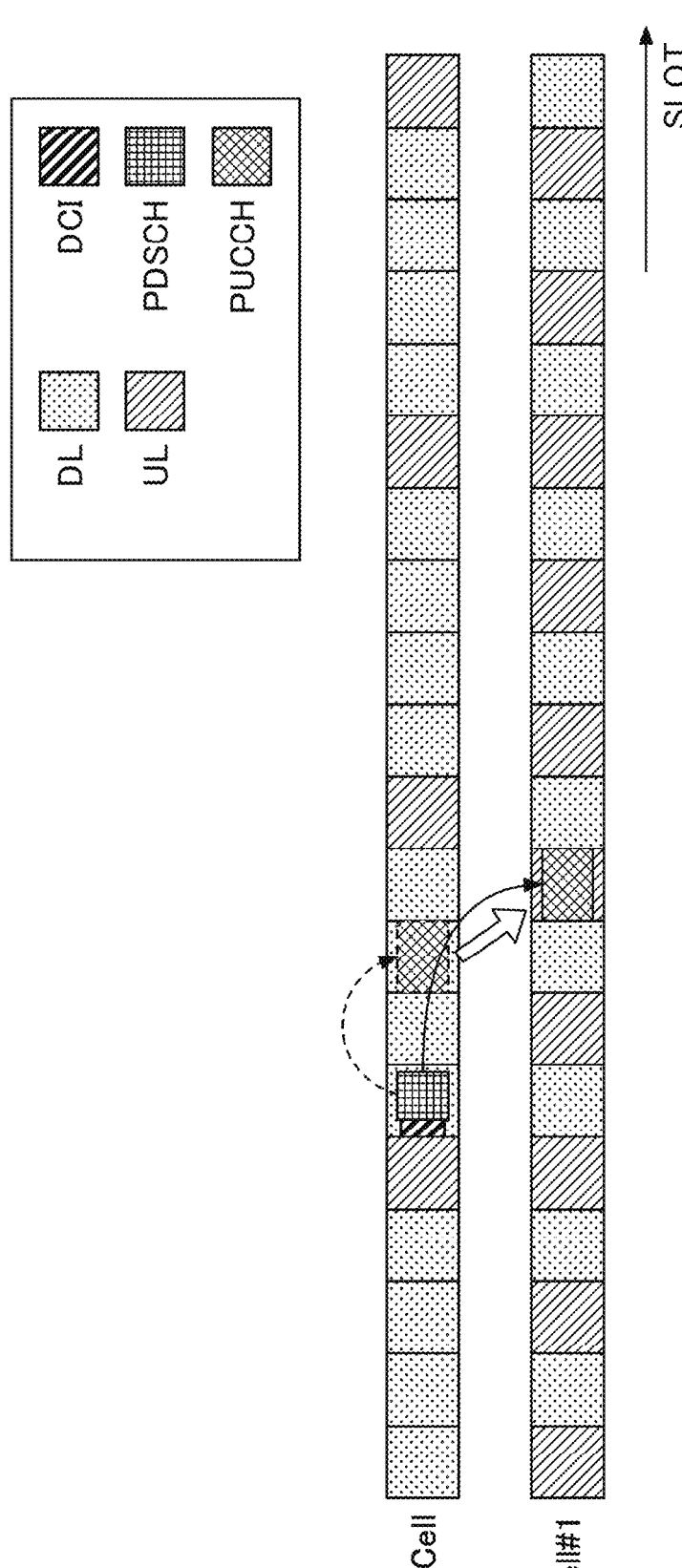
FIG. 8 is a drawing illustrating an example (5) of PUCCH transmission in an embodiment of the present invention.

FIG. 7 is a drawing illustrating an example (4) of PUCCH transmission in an embodiment of the present invention. FIG. 8 is a drawing illustrating an example (5) of PUCCH transmission in an embodiment of the present invention. In a case where a slot indicated by the HARQ feedback timing indicator cannot be used in the PUCCH transmission CC, the terminal 20 may switch the PUCCH transmission CC. Furthermore, as illustrated in FIG. 7 or FIG. 8, in a case where there is no CC that is available in the same slot or in a slot that at least partially overlaps with the slot, the terminal 20 may change the slot for transmitting HARQ-ACK. FIG. 7 is an example of changing to a slot that is available at an earlier timing in the time domain, and FIG. 8 an example of changing to a slot that is available at a later timing in the time domain. Alternatively, the terminal 20 is not required to assume a case in which there is no available CC.

In addition, in a case where the base station 10 indicates the PUCCH transmission CC to the terminal 20 by using RRC, MAC-CE and/or DCI, the base station 10 and the terminal 20 may first determine the PUCCH transmission CC, and then, may determine the slot for transmitting PUCCH. In addition, in a case where the base station 10 indicates the PUCCH transmission CC to the terminal 20 by using RRC, MAC-CE and/or DCI, the base station 10 and the terminal 20 may first determine the slot for transmitting PUCCH, and then, may determine the PUCCH transmission CC.

Figure 9:
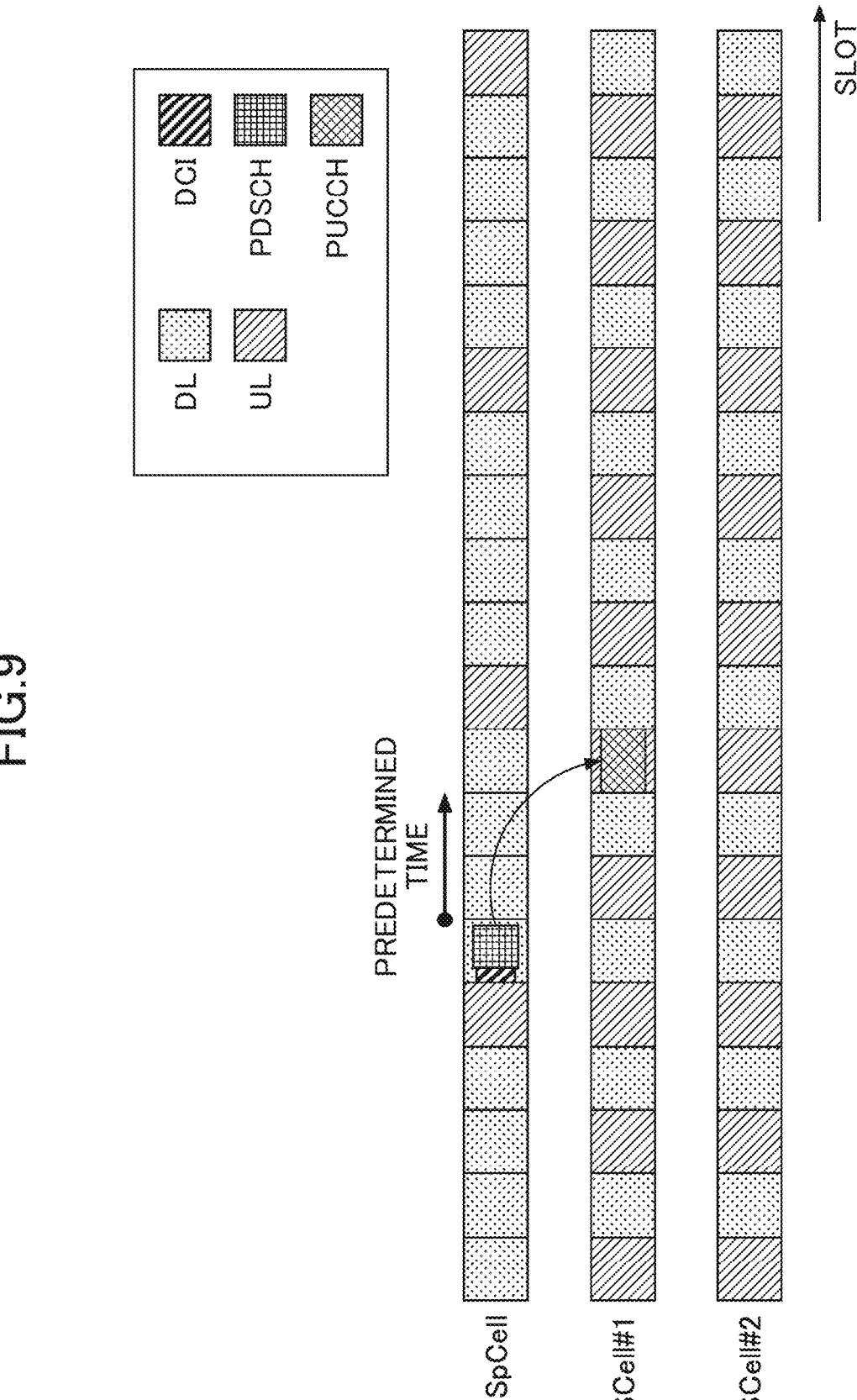
FIG. 9 is a drawing illustrating an example (6) of PUCCH transmission in an embodiment of the present invention.

FIG. 9 is a drawing illustrating an example (6) of PUCCH transmission in an embodiment of the present invention. As illustrated in FIG. 9, the terminal 20 may transmit HARQ-ACK using a slot and a CC that can be used for transmitting PUCCH at an earliest timing after an elapse of a predetermined time from the PDSCH reception. Note that HARQ-ACK may mean HARQ feedback, and may include ACK, that is a positive response, or may include NACK, that is a negative response. In a case where an operation is configured by an upper layer, the UE may assume that the HARQ feedback timing indicator field in some of or all of DCI format 1_0, DCI format 1_1, and DCI format 1_2 is not present. With respect to the HARQ-ACK of PDSCH scheduled by DCI in which the HARQ feedback timing indicator field is not present, HARQ-ACK may be transmitted in a slot and CC that can be used for transmitting PUCCH at an earliest timing after an elapse of a predetermined time from the PDSCH reception. According to a method illustrated in FIG. 9, HARQ feedback latency is minimized and the signaling such as the HARQ feedback timing indicator is not required, and thus, the DCI overhead can be reduced.

In an example illustrated in FIG. 9, the terminal 20 transmits PUCCH in SCell #1 using an earliest slot after an elapse of a predetermined time from the PDSCH reception. Note that, in a case where a plurality of CCs can be used, the priority order between CCs may be specified or configured in advance. For example, a CC with a smaller CC index may be prioritized to be used for PUCCH transmission. In addition, the PUCCH switching destination CC candidates may be configured in advance by an upper layer. According to the above configuration, it is possible to prevent PUCCH from being transmitted using a CC that is not desired by the terminal 20.

For example, the base station 10 may indicate the PUCCH transmission CC to, or may select the PUCCH transmission CC for, the terminal 20 by using DCI. As described in 1) to 3) below, the PUCCH transmission CC may be indicated by using a predetermined field of DCI.

1) A new CC indication field for indicating the PUCCH transmission CC may be specified. For example, a new CC indication field may be specified in some of or in all of DL scheduling DCIs that are DCI format 1_0, DCI format 1_1, and DCI format 1_2. Table 1 is an example of a new CC indication field.

TABLE 1

| DCI | PUCCH transmission CC |
| --- | --- |
| 00 | CC#0 |
| 01 | CC#1 |
| 10 | CC#2 |
| 11 | CC#3 |

As illustrated in Table 1, the PUCCH transmission CC is specified by the DCI codepoint. Table 1 illustrates an example of the CC indication field being 2 bits. The CC index associated with each DCI codepoint may be indicated by RRC or MAC-CE.

2) The PUCCH transmission CC may be indicated by an existing DCI field. For example, the PUCCH transmission CC may be indicated by the PRI (PUCCH resource indicator) field. Table 2 illustrates an example of indicating the PUCCH transmission CC by using the PRI field.

TABLE 2

| PRI field | PUCCH resource | PUCCH transmission CC |
|---|---|---|
| 000 | PUCCH#0 | CC#0 |
| 001 | PUCCH#1 | CC#1 |
| 010 | PUCCH#2 | CC#2 |
| . . . | . . . | . . . |

As illustrated in Table 2, the PUCCH transmission CC may be associated with each PUCCH resource. The transmission destination CC associated with each PUCCH resource may be configured by an upper layer.

3) An existing DCI field may be used for indicating the PUCCH transmission CC. For example, the PUCCH transmission CC may be indicated by using the carrier indicator field (CIF, Carrier indicator field). For example, it may be assumed that CIF is present in a case of configuring the PUCCH carrier switching regardless of the PDSCH cross-carrier scheduling. The base station 10 may indicate the PUCCH transmission CC to the terminal 20 by using CIF.

Note that, in a case where the cross-carrier scheduling is configured, the PDSCH scheduling CC and the PUCCH transmission CC may be indicated by using the common CIF. Alternatively, the PDSCH scheduling CC may be indicated by using CIF, and the PUCCH transmission CC may be indicated by a method of the above-described 1) or the above-described 2). Alternatively, CIF may be enhanced, PDSCH scheduling CC may be indicated by using the first CIF, and the PUCCH transmission CC may be indicated by using the second CIF.

Figure 10:
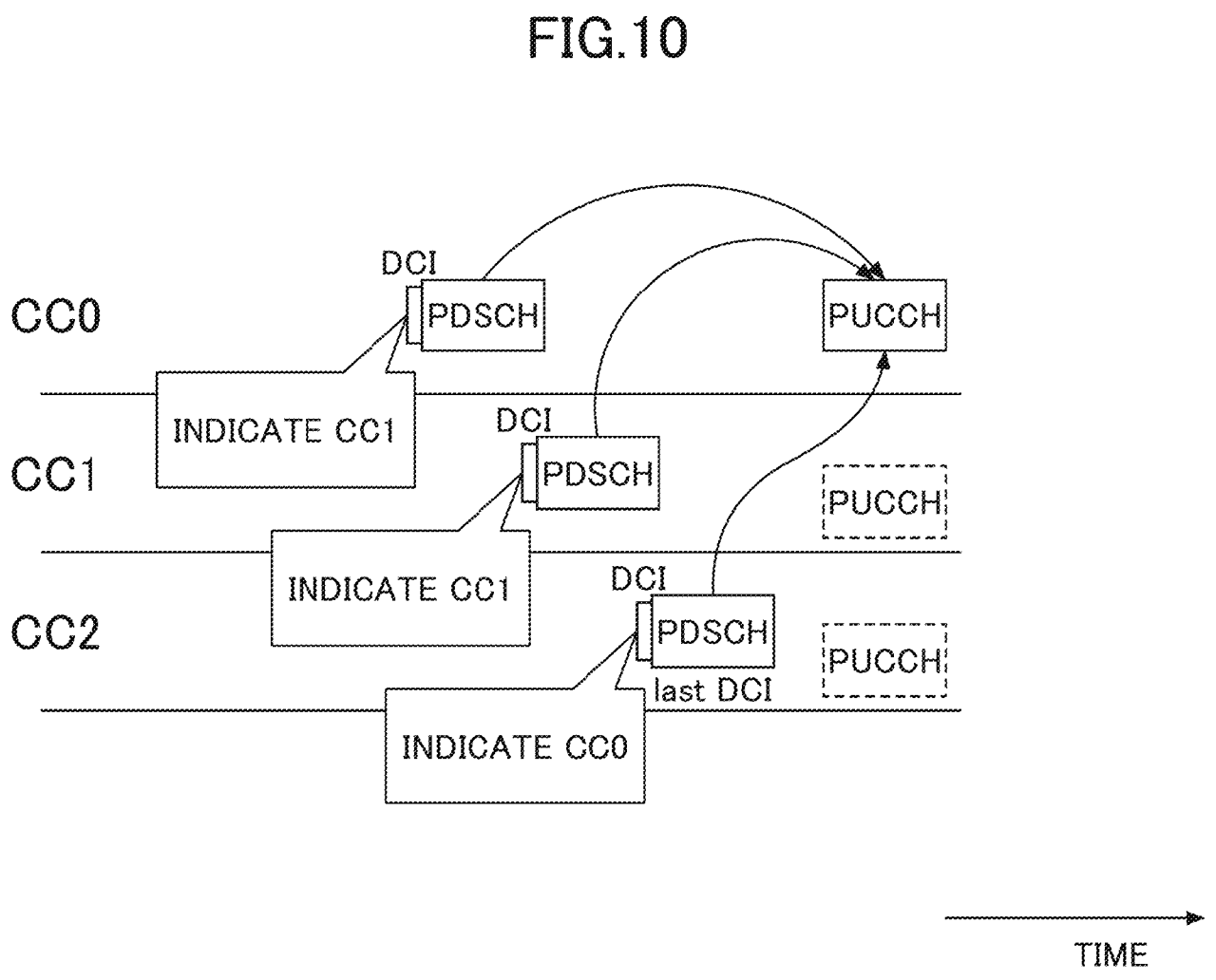

FIG. 10 is a drawing illustrating an example (7) of PUCCH transmission in an embodiment of the present invention. In a case where HARQ-ACK corresponding to multiple PDSCHs that are triggered or scheduled by multiple DCIs is transmitted using PUCCH, which DCI is to be used to identify the PUSCH transmission CC to be used may be configured or may be specified in advance. For example, as illustrated in FIG. 10, the PUCCH transmission CC (CC0 in FIG. 10) may be determined based on the last DCI (last DCI) in the time and frequency direction.

FIG. 11 is a drawing illustrating an example of MAC-CE in an embodiment of the present invention. The base station 10 may indicate the PUCCH transmission CC to the terminal 20 by using MAC-CE. As illustrated in FIG. 11, a MAC-CE indicating the PUCCH transmission CC may be specified. The terminal 20 may transmit PUCCH by using the CC indicated by the MAC-CE. The PUCCH transmission cell may be indicated by one MAC-CE per cell group, or the PUCCH transmission cell may be indicated by one MAC-CE per UE.

In an example illustrated in FIG. 10, the MAC-CE may include a cell group index, and the size of bits indicating the cell group index may be determined depending on the number of cell groups. In addition, in a case where the PUCCH transmission cell is not indicated per cell group, the cell group index is not required to be included in the MAC-CE. For example, in an example illustrated in FIG. 10, one PUCCH transmission cell is indicated from among up to eight cells. The terminal 20 may transmit PUCCH by using the cell of $C_n=1$. In addition, in the MAC-CE, the cell is not required to be indicated by a bitmap, and the cell may be indicated by a cell index. For example, in a case where one PUCCH transmission cell is indicated from among eight cells, the corresponding bit width in the MAC-CE may have three bits.

Figure 12:
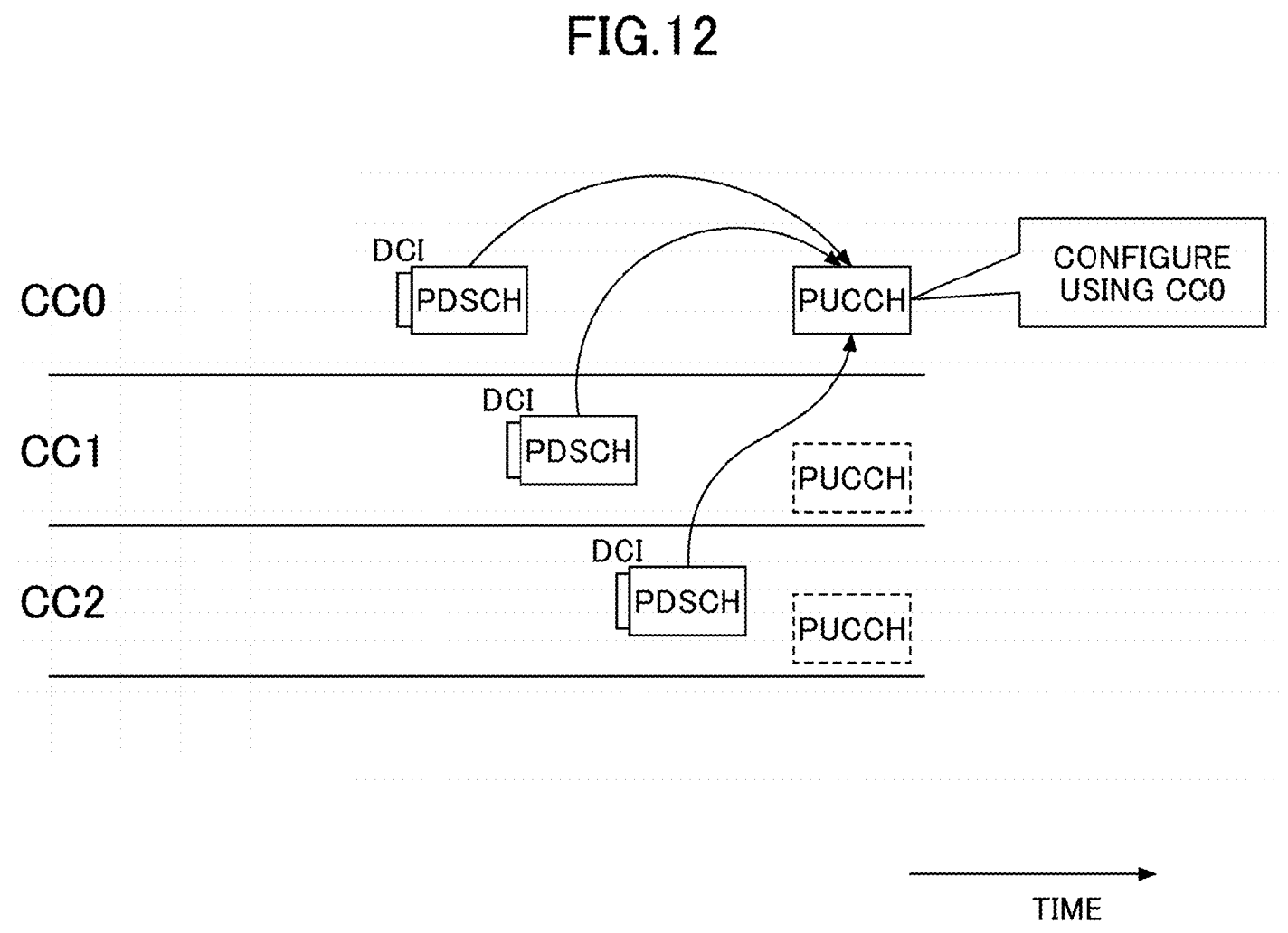

FIG. 12 is a drawing illustrating an example (8) of PUCCH transmission in an embodiment of the present invention. When performing the PUCCH carrier switching, the terminal 20 may use the PUCCH resource of the PUCCH transmission CC indicated by MAC-CE and/or DCI as illustrated in FIG. 12. For example, the terminal 20 may use the PUCCH resource of the scheduled cell indicated by PRI or by information indicating the PUCCH transmission CC.

Figure 13:
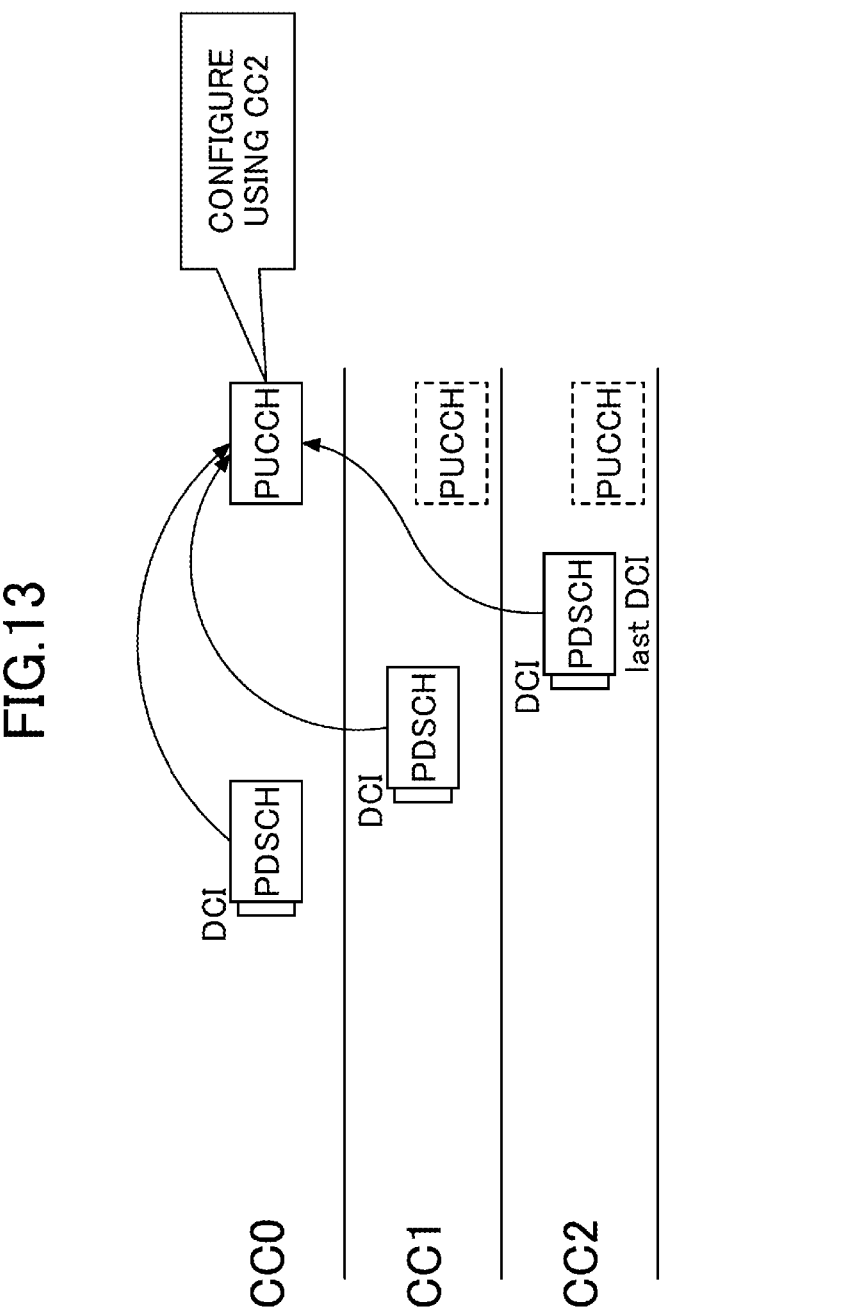
FIG. 13 is a drawing illustrating an example (9) of PUCCH transmission in an embodiment of the present invention.

FIG. 13 is a drawing illustrating an example (9) of PUCCH transmission in an embodiment of the present invention. When performing the PUCCH carrier switching, the terminal 20 may use the PUCCH resource that is configured in the CC via which the DCI indicating PRI or information indicating the PUCCH transmission CC is received as illustrated in FIG. 13. For example, the terminal 20 may use the PUCCH resource of the scheduling cell indicating PRI or information indicating the PUCCH transmission CC. In addition, in a case of transmitting PUCCHs scheduled by multiple CCs as illustrated in FIG. 13, the terminal 20 may use the PUCCH resource that is configured by the CC via which the last DCI (last DCI) in the time and frequency domain is received.

In addition, when performing the PUCCH carrier switching, the terminal 20 may use the PUCCH resource that is arranged in the CC via which PDSCH scheduled by the last DCI is received.

Note that PUCCH-config may be configured for each BWP (Bandwidth Part). The above-described "CC" may be replaced with "BWP in CC". Note that an embodiment of the present invention may be performed in a case where the PUCCH carrier switching is configured. In addition, "PUCCH carrier switching" may be replaced with "indicating PUCCH transmission CC using RRC, MAC-CE and/or DCI". Note that "slot" and "subslot" may be replaced with each other. Note that SUL (Supplementary Uplink) may be included or is not required to be included in the target CC of the PUCCH carrier switching. Whether SUL is included in the target CC of the PUCCH carrier switching may be reported from the terminal 20 to the base station 10 using the UE capability report.

An embodiment of the present invention may be limited to be applied to the terminal 20 that has reported the UE capability described in 1) and/or 2) below.

1) UE capability indicating whether to support the PUCCH carrier switching. For example, the UE capability may indicate whether the PUCCH transmission CC is to be indicated by RRC, MAC-CE and/or DCI. In addition, the UE capability may indicate whether the PUCCH transmission CC is to be indicated by MAC-CE. In addition, the UE capability may indicate whether the PUCCH transmission CC is to be indicated by DCI.

2) The number of CCs that will be a switching destination of the PUCCH carrier switching. The number of CCs may be the maximum number of CCs that will be a switching destination of the PUCCH carrier switching and that can be configured per CC list.

In addition, as the UE capability, CCs that will be a switching destination of the PUCCH carrier switching may be configured as one or more NR carrier types that are described below. For example, the terminal 20 may report a carrier type that is capable of transmitting PUCCH, and the PUCCH carrier can be switched only to that carrier type.

The one or more NR carrier types may be {FR1 licensed TDD (fr1-NonSharedTDD-r16), FR1 unlicensed TDD (fr1-SharedTDD-r16), FR1 licensed FDD (fr1-NonSharedFDD-r16), FR2 (fr2-r16)}.

In addition, the one or more NR carrier types may be {FR1-NonSharedTDD, FR1-SharedTDD, FR1-Non-SharedFDD, FR2}.

The timing of applying the indication of the PUCCH transmission CC (activation timing) may be specified. For example, the time from a time point of indicating the PUCCH transmission CC using RRC, MAC-CE and/or DCI to a time point of actually applying the PUCCH carrier switching may be specified.

Regarding the PUCCH transmission CC, the base station 10 and the terminal 20 are required to have common recognition. By specifying the timing of applying the indication of the PUCCH transmission CC, in a case where the terminal 20 fails to receive the indication, for example, the base station 10 can recognize that the indication is not activated.

Note that there may be an activated state or a deactivated state with respect to the PUCCH carrier switching. The indication of the PUCCH transmission CC may be referred to as an activation command, or, an activation command for activating the indication may be specified separately from the indication. In addition, a deactivation command for deactivating the indication may be specified.

Figure 14:
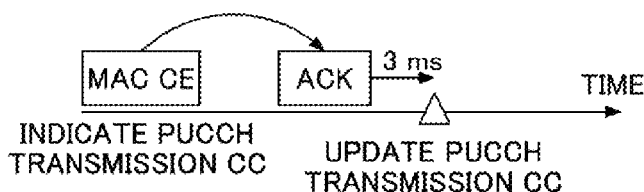
FIG. 14 is a drawing illustrating an example (1) of PUCCH carrier switching in an embodiment of the present invention.

FIG. 14 is a drawing illustrating an example (1) of PUCCH carrier switching in an embodiment of the present invention. As illustrated in FIG. 14, the PUCCH transmission CC may be assumed to be switched after an elapse of a predetermined time from a time point at which ACK corresponding to MAC-CE indicating the PUCCH transmission CC is transmitted. The predetermined time may be 3 ms, or may be a time until the starting time point of a subsequent slot after an elapse of 3 ms. Note that "indication by MAC-CE" may mean that the PUCCH transmission CC is indicated by MAC-CE alone, or, may mean that a CC list including multiple CCs is indicated by MAC-CE and one CC is indicated by DCI.

Figure 15:
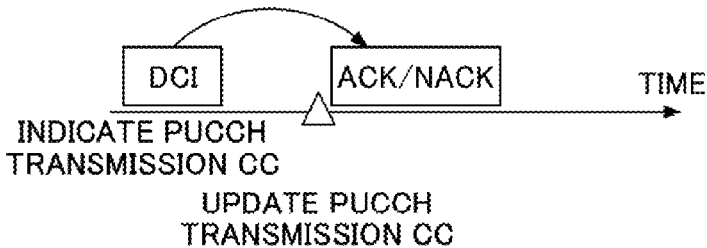
FIG. 15 is a drawing illustrating an example (2) of PUCCH carrier switching in an embodiment of the present invention.

FIG. 15 is a drawing illustrating an example (2) of PUCCH carrier switching in an embodiment of the present invention. As illustrated in FIG. 15, the PUCCH transmission CC may be assumed to be switched before transmission of PUCCH/PUSCH transmitting ACK/NACK corresponding to DCI indicating the PUCCH transmission CC.

Figure 16:
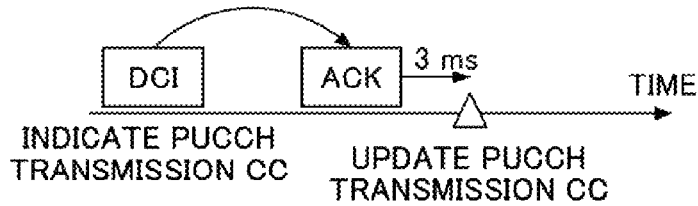
FIG. 16 is a drawing illustrating an example (3) of PUCCH carrier switching in an embodiment of the present invention.

FIG. 16 is a drawing illustrating an example (3) of PUCCH carrier switching in an embodiment of the present invention. As illustrated in FIG. 16, the PUCCH transmission CC may be assumed to be switched after an elapse of a predetermined time from a time point at which ACK corresponding to DCI indicating the PUCCH transmission CC is transmitted. The predetermined time may be 3 ms, or may be a time until the starting time point of a subsequent slot after an elapse of 3 ms.

In addition, the deactivation timing may be specified. Regarding the PUCCH transmission CC that has been activated in the past, the PUCCH transmission CC that has been activated in the past may be assumed to be deactivated at the time when the subsequent PUCCH transmission CC is activated.

Figure 17:
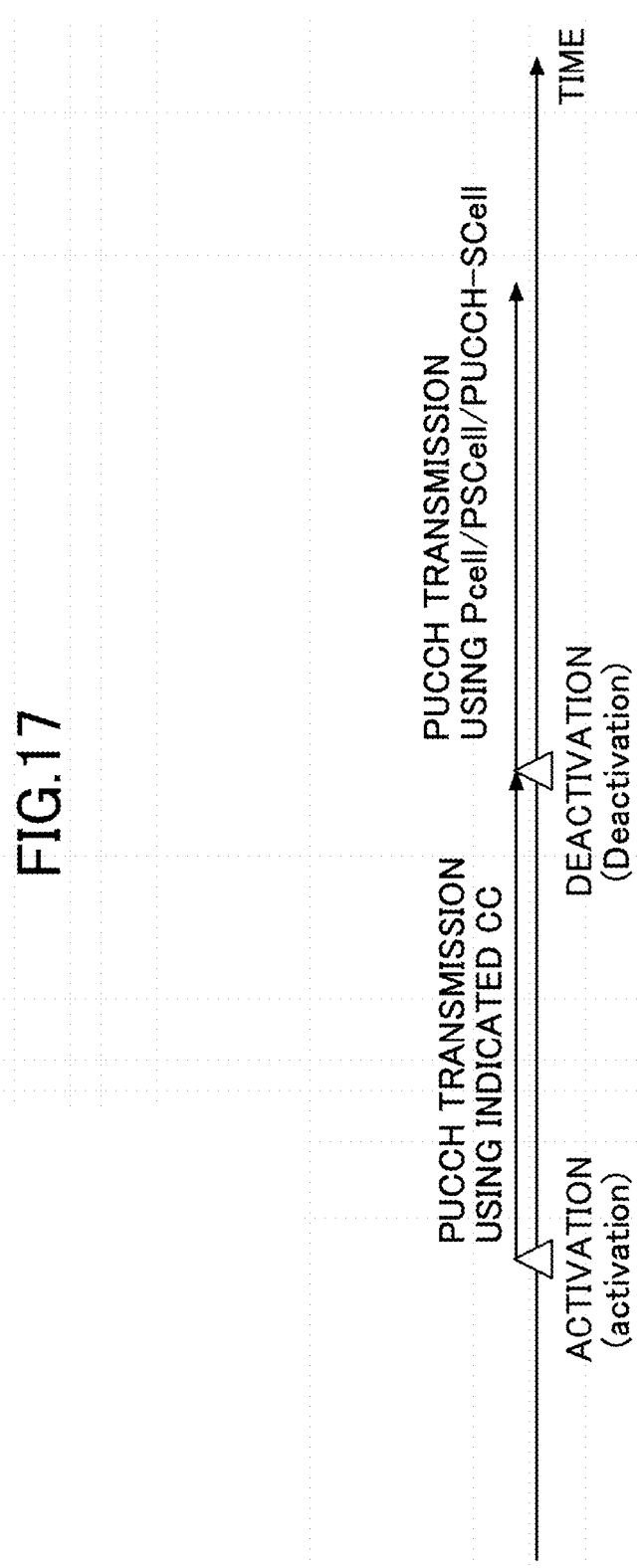
FIG. 17 is a drawing illustrating an example of deactivating PUCCH carrier switching in an embodiment of the present invention.

FIG. 17 is a drawing illustrating an example of deactivating PUCCH carrier switching in an embodiment of the present invention. When a deactivation command is specified, with respect to the terminal 20 that has received the deactivation command, the PUCCH carrier switching may be deactivated. The deactivation command may be indicated by MAC-CE, or may be indicated by DCI. The deactivation may be performed after an elapse of a predetermined time from the reception of the activation command or from the indication of the PUCCH transmission CC via MAC-CE and/DCI. As illustrated in FIG. 17, during the deactivation period, the operation may fallback (may be switched) to an operation of transmitting PUCCH using PCell, PSCell, or PUCCH-SCell.

Note that, in a case where the indication of the PUCCH transmission CC illustrated in FIG. 14 is a MAC-CE indicating the deactivation, the PUCCH transmission CC may be assumed to be switched after an elapse of a predetermined time from a time point at which ACK corresponding to the MAC-CE is transmitted. The predetermined time may be 3 ms, or may be a time until the starting time point of a subsequent slot after an elapse of 3 ms.

Note that, in a case where the indication of the PUCCH transmission CC illustrated in FIG. 15 is a DCI indicating the deactivation, the PUCCH transmission CC may be assumed to be switched before transmission of PUCCH/PUSCH transmitting ACK/NACK corresponding to the DCI.

Note that, in a case where the indication of the PUCCH transmission CC illustrated in FIG. 16 is a DCI indicating the deactivation, the PUCCH transmission CC may be assumed to be switched after an elapse of a predetermined time from a time point at which ACK corresponding to the DCI is transmitted. The predetermined time may be 3 ms, or may be a time until the starting time point of a subsequent slot after an elapse of 3 ms.

The PUCCH power control is configured by pucch-PowerControl included in the RRC information element, PUCCH-Config and by PUCCH spatial relation included in PUCCH resource. A plurality of sets of P0, $\alpha$, and path-loss RS may be configured by the pucch-PowerControl, and an ID indicating a set may be indicated by the PUCCH spatial relation.

In a case where the PUCCH carrier switching is configured, the PUCCH transmission power may be determined by using a parameter for the PUCCH power control that is configured in the PUCCH transmission CC (or BWP). The parameter may include the pucch-PowerControl included in the PUCCH-Config and the PUCCH spatial relation included in the PUCCH resource.

Note that, with respect to the OL-PC (Open loop power control) and the CL-PC (Closed loop power control) in the PUCCH carrier switching, 1) and 2) described below may be both assumed.

1) In a case where the PUCCH transmission carrier is dynamically indicated.

2) In a case where the PUCCH transmission carrier is semi-statically indicated. For example, in a case where the PUCCH carrier switching is performed only if PUCCH cannot be transmitted by using a PUCCH transmission slot indicated by the HARQ feedback timing indicator.

Figure 18:
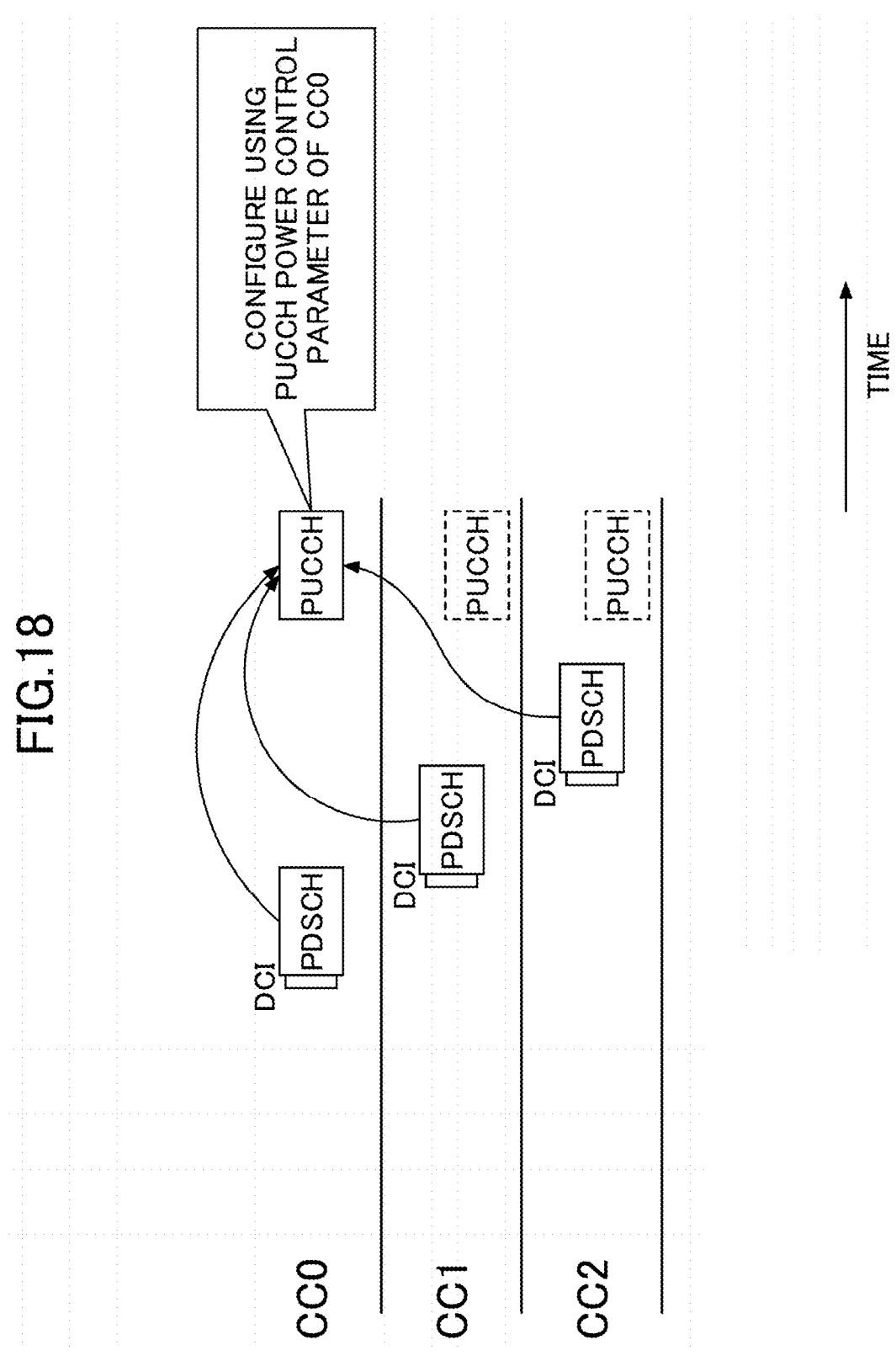
FIG. 18 is a drawing illustrating an example (1) of PUCCH transmission power control in an embodiment of the present invention.

FIG. 18 is a drawing illustrating an example (1) of PUCCH transmission power control in an embodiment of the present invention. When performing the PUCCH carrier switching, the terminal 20 may use the PUCCH power control parameter of the PUCCH transmission CC indicated by MAC-CE and/or DCI as illustrated in FIG. 18. For example, the terminal 20 may use the PUCCH power control parameter of the scheduled cell indicated by PRI or by information indicating the PUCCH transmission CC.

Figure 19:
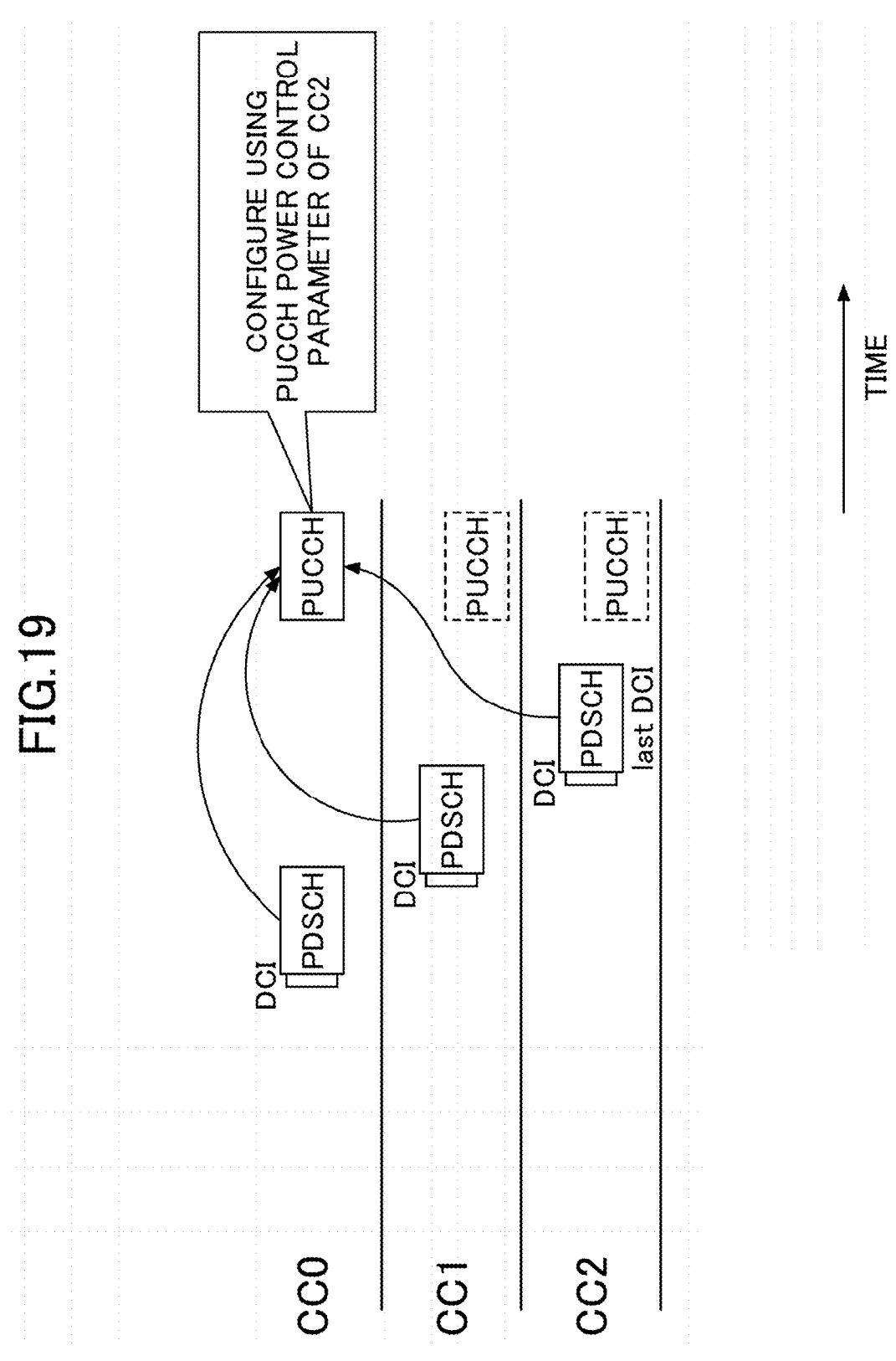
FIG. 19 is a drawing illustrating an example (2) of PUCCH transmission power control in an embodiment of the present invention.

FIG. 19 is a drawing illustrating an example (2) of PUCCH transmission power control in an embodiment of the present invention. When performing the PUCCH carrier switching, the terminal 20 may use the PUCCH power control parameter that is configured in the CC via which the DCI indicating PRI or information indicating the PUCCH transmission CC is received as illustrated in FIG. 19. For example, the terminal 20 may use the PUCCH power control parameter of the scheduling cell used for indicating PRI or information indicating the PUCCH transmission CC. In addition, in a case of transmitting PUCCHs scheduled by multiple CCs as illustrated in FIG. 19, the terminal 20 may use the PUCCH power control parameter that is configured by the CC via which the last DCI (last DCI) in the time and frequency domain is received.

In addition, when performing the PUCCH carrier switching, the terminal 20 may use the PUCCH power control parameter that is arranged in the CC via which PDSCH scheduled by the last DCI is received.

Figure 20:
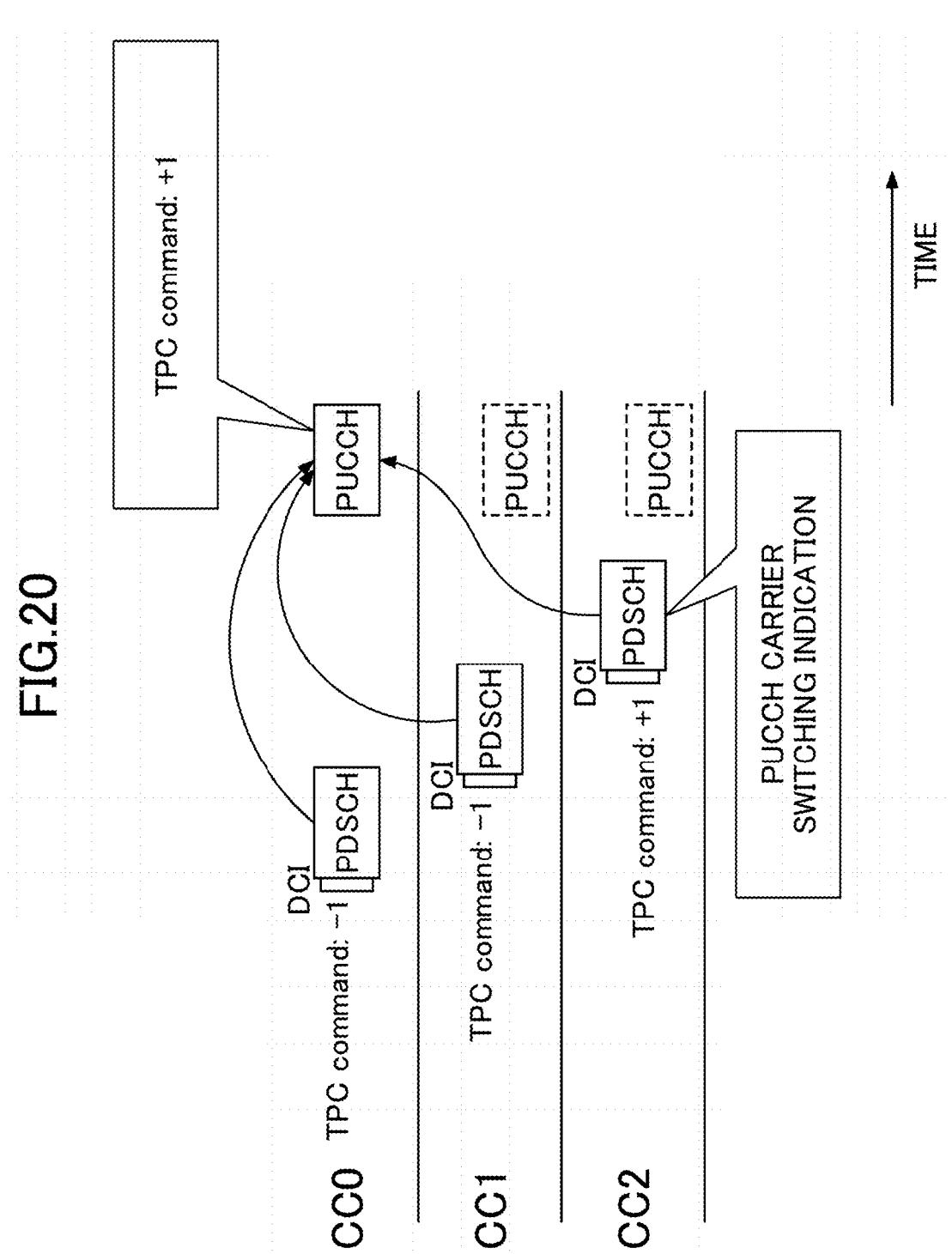
FIG. 20 is a drawing illustrating an example (3) of PUCCH transmission power control in an embodiment of the present invention.

FIG. 20 is a drawing illustrating an example (3) of PUCCH transmission power control in an embodiment of the present invention. As illustrated in FIG. 20, in a case where the PUCCH carrier switching is performed or indicated, the terminal 20 may reset the TPC (Transmission Power Control) command accumulated value, or may set the value to be zero. For example, the TPC command accumulated value of PUCCH in CC0 may be a different value from the TPC command accumulated value of PUCCH in CC1 because the frequency and propagation path are different.

Figure 21:
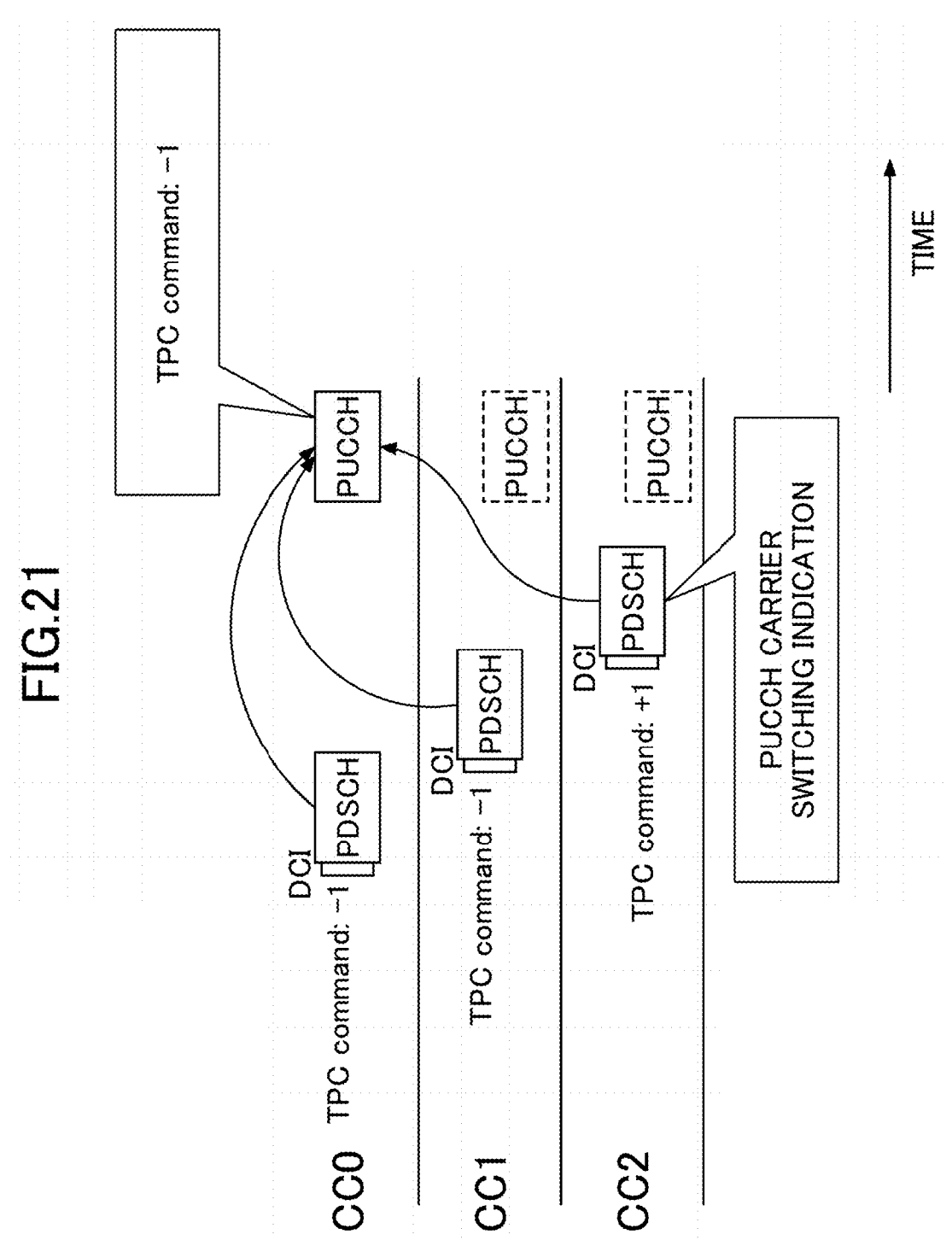
FIG. 21 is a drawing illustrating an example (4) of PUCCH transmission power control in an embodiment of the present invention.

FIG. 21 is a drawing illustrating an example (4) of PUCCH transmission power control in an embodiment of the present invention. As illustrated in FIG. 21, the terminal 20 may accumulate the TPC command accumulated values before and after the execution of or the indication of the PUCCH carrier switching.

Figure 22:
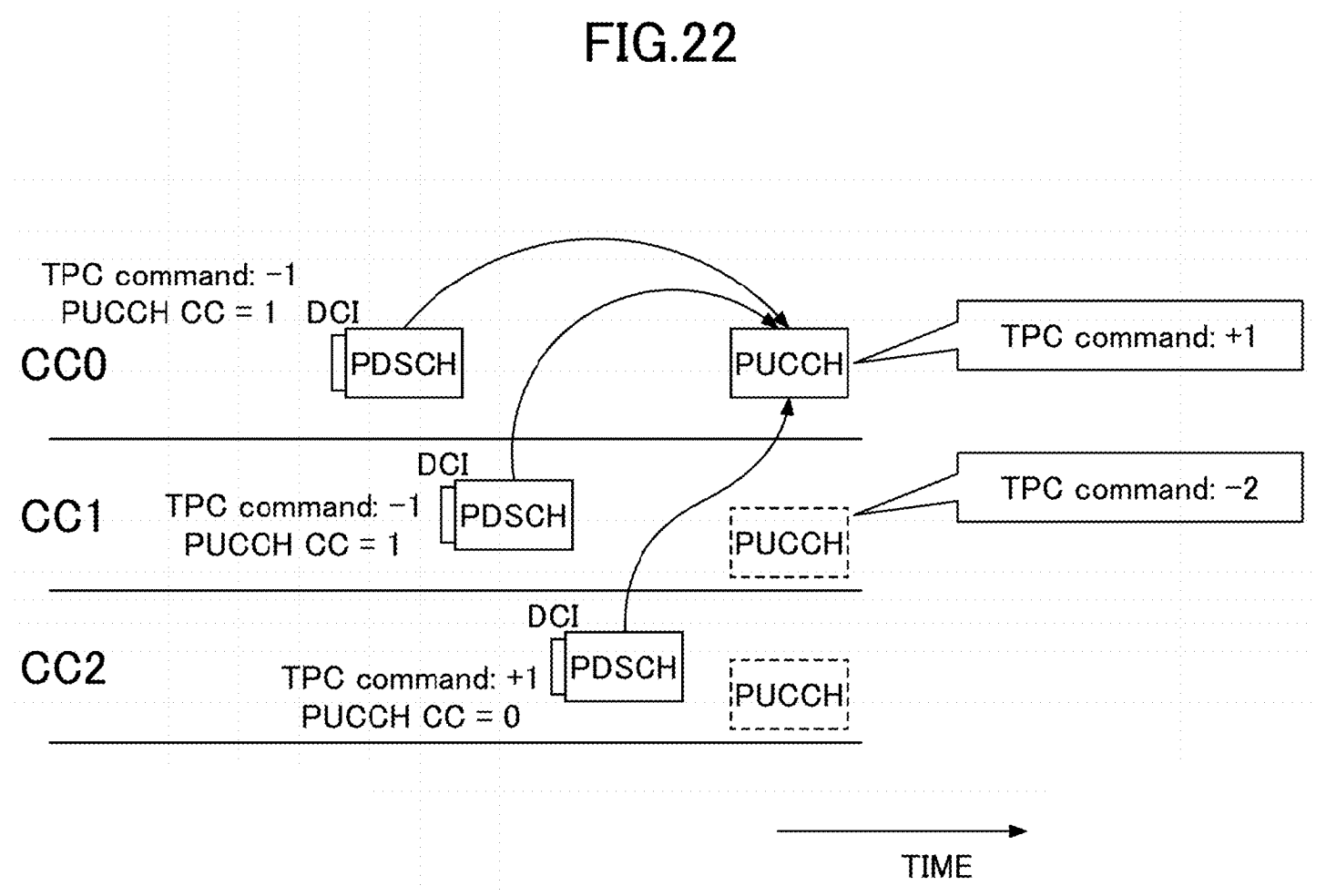

FIG. 22 is a drawing illustrating an example (5) of PUCCH transmission power control in an embodiment of the present invention. As illustrated in FIG. 22, the CL-PC accumulated value may be maintained per CC. For example, in a case where the TPC command is indicated for the PUCCH resource of CC0, the accumulated value may be maintained as the TPC command accumulated value for the PUCCH of CC0, and in a case where the TPC command is indicated for the PUCCH resource of CC1, the accumulated value may be maintained as the TPC command accumulated value for the PUCCH of CC1. In an example of FIG. 22, PUCCH of CC1 is not transmitted. Hereinafter, in a case where CC1 is indicated as the PUCCH transmission CC, PUCCH may be transmitted by using the TPC command accumulated value that is accumulated in CC1.

Figure 23:
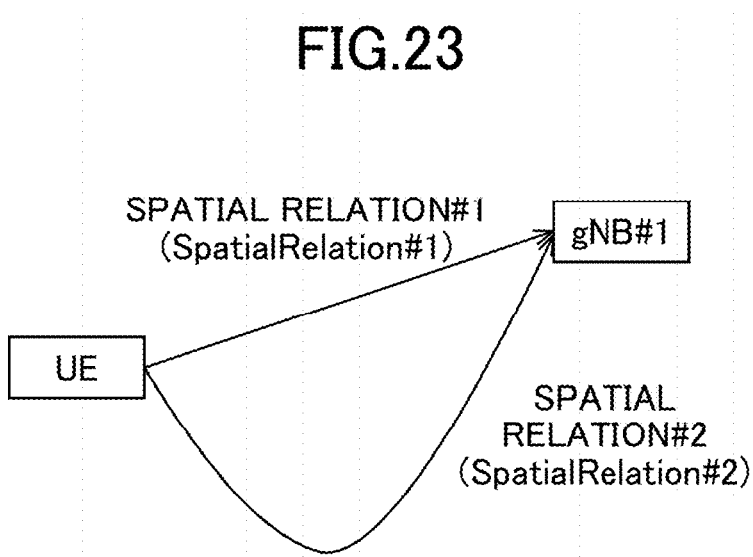
FIG. 23 is a drawing illustrating an example of spatial relation in an embodiment of the present invention.

FIG. 23 is a drawing illustrating an example of spatial relation in an embodiment of the present invention. As illustrated in FIG. 23, in a case of performing transmission to one base station 10, the path-losses are different when beams are different, that is, when spatial relations (Spatial-Relation) are different. In addition, in a case of performing transmission to two base stations 10, the path-losses are different. Therefore, the terminal 20 is capable of maintaining the CL-PC accumulated value in two ways.

One spatial relation is configured for each PUCCH resource. In addition, closedLoopIndex={i0, i1} is indicated. With respect to the PUCCH resource for which 10 is indicated, and with respect to the PUCCH resource for which i1 is indicated, the CL-PC TPC command accumulated values are independently maintained.

Figure 24:
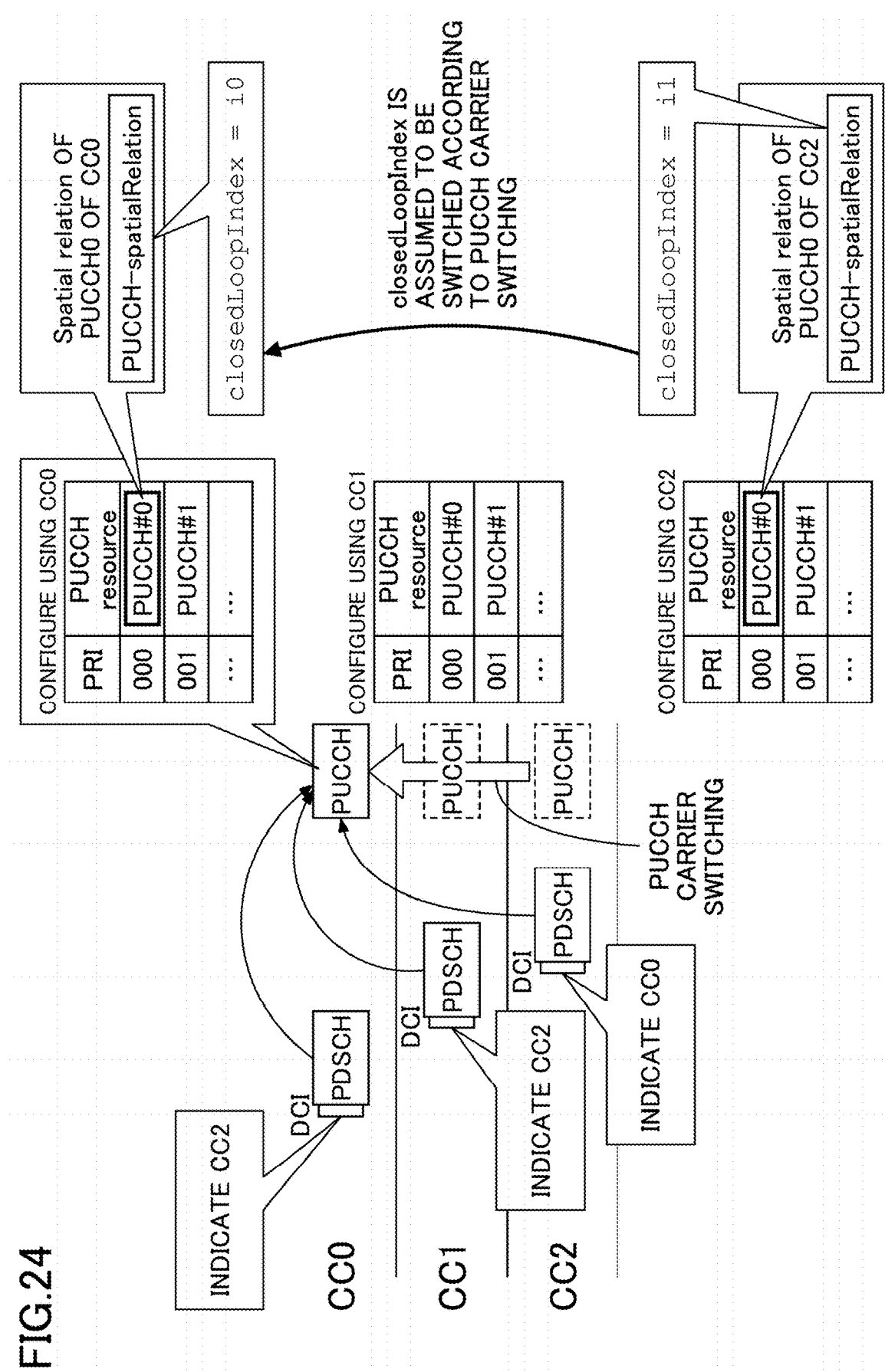
FIG. 24 is a drawing illustrating an example (6) of PUCCH transmission power control in an embodiment of the present invention.

FIG. 24 is a drawing illustrating an example (6) of PUCCH transmission power control in an embodiment of the present invention. The closedLoopIndex of PUCCH is configured in the spatialRelation of PUCCH of each PUCCH resource. Therefore, in the PUCCH resource determined in the above-described embodiment of the present invention, closedLoopIndex={i0, i1} of PUCCH that is configured in the spatialRelation of PUCCH that is configured in the determined PUCCH resource may be assumed to be used.

For example, as illustrated in FIG. 24, in a case where different closedLoopIndexes of PUCCH are configured between PUCCH resources before and after the PUCCH carrier switching, the closedLoopIndex of PUCCH may be assumed to be switched in accordance with the PUCCH carrier switching.

Note that the closedLoopIndex, etc., are examples of the TPC parameters, and, RRC parameters that are applied to the PUCCH power control such as P0, α value, PL-RS, and the like, may also be configured to the terminal 20 using the same mechanism as the above-described closedLoopIndex. For example, in a case where the PUCCH resource switching occurs in accordance with the PUCCH carrier switching, the TPC parameters associated with the switching destination PUCCH resource may be applied by using the above-described same mechanism.

Figure 25:
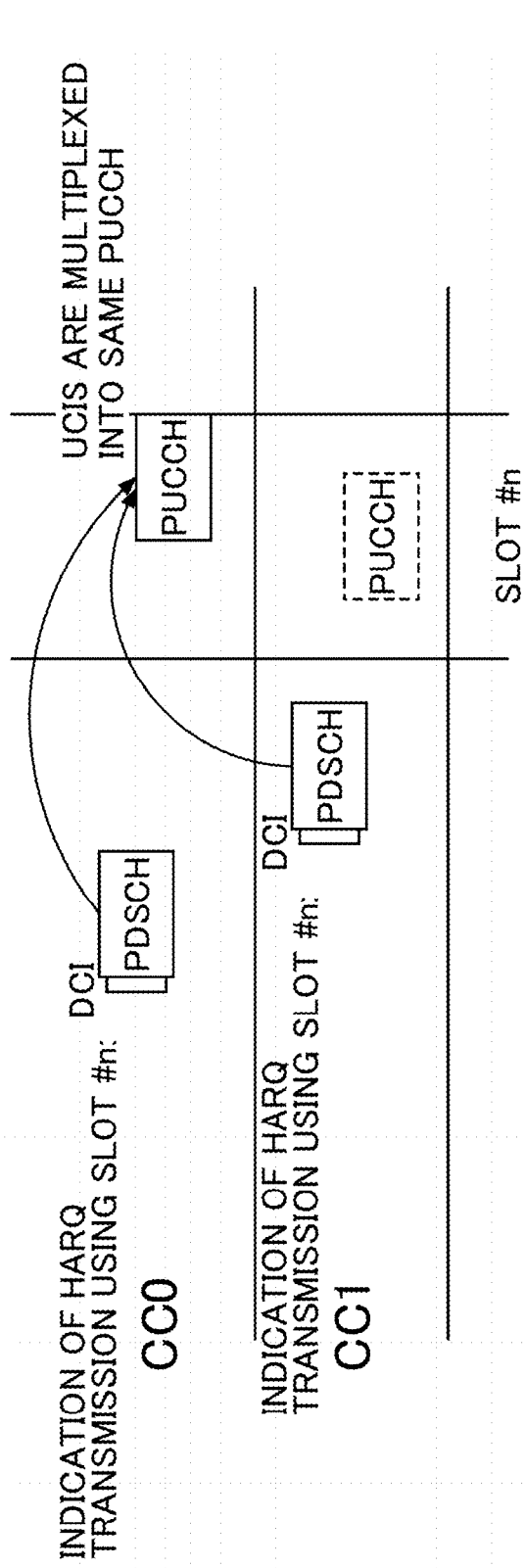
FIG. 25 is a drawing illustrating an example (1) of UCI multiplexing in an embodiment of the present invention.

FIG. 25 is a drawing illustrating an example (1) of UCI multiplexing in an embodiment of the present invention. As illustrated in FIG. 25, in a case where transmission of multiple UCIs using the same slot or subslot is indicated by the HARQ feedback timing indicator field, the multiple UCIs may be multiplexed into the same PUCCH resource to be transmitted. Hereinafter, "slot" may be replaced with "subslot".

Hereinafter, a case will be described in which the PUCCH carrier switching is dynamically performed by taking into account the numerology or subcarrier spacing (SCS) of the PUCCH transmission CC.

Figure 26:
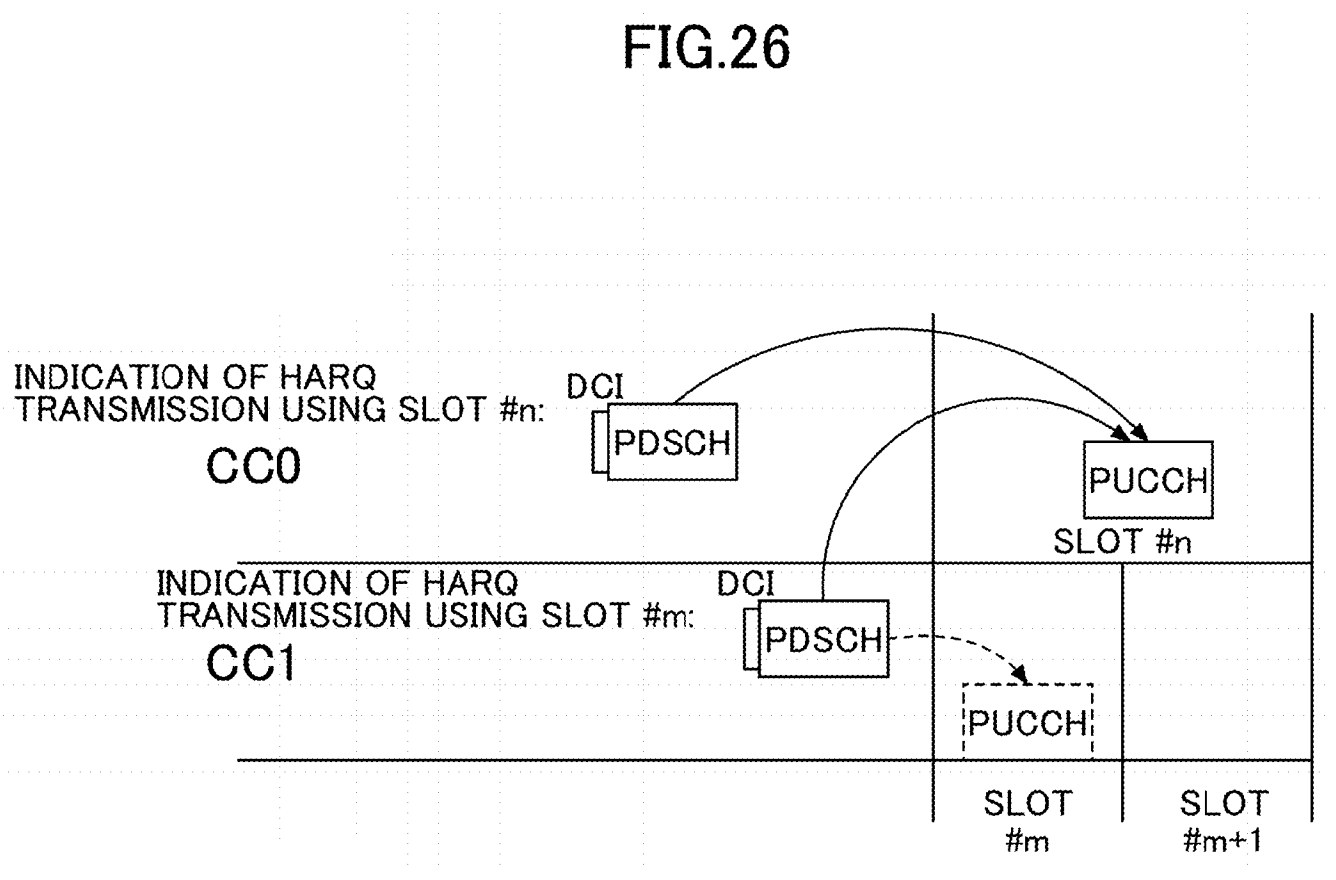

FIG. 26 is a drawing illustrating an example (2) of UCI multiplexing in an embodiment of the present invention. As illustrated in FIG. 26, in a case where SCSs are different between CC0 and CC1, and SCS of the PUCCH transmission CC is smaller, the two UCIs are not transmitted in the same slot. HARQ-ACK transmission using slot #n is indicated in CC0, and HARQ-ACK transmission using slot #m is indicated in CC1. In a case illustrated in FIG. 26, PUCCH is transmitted using slot #n in CC0.

Figure 27:
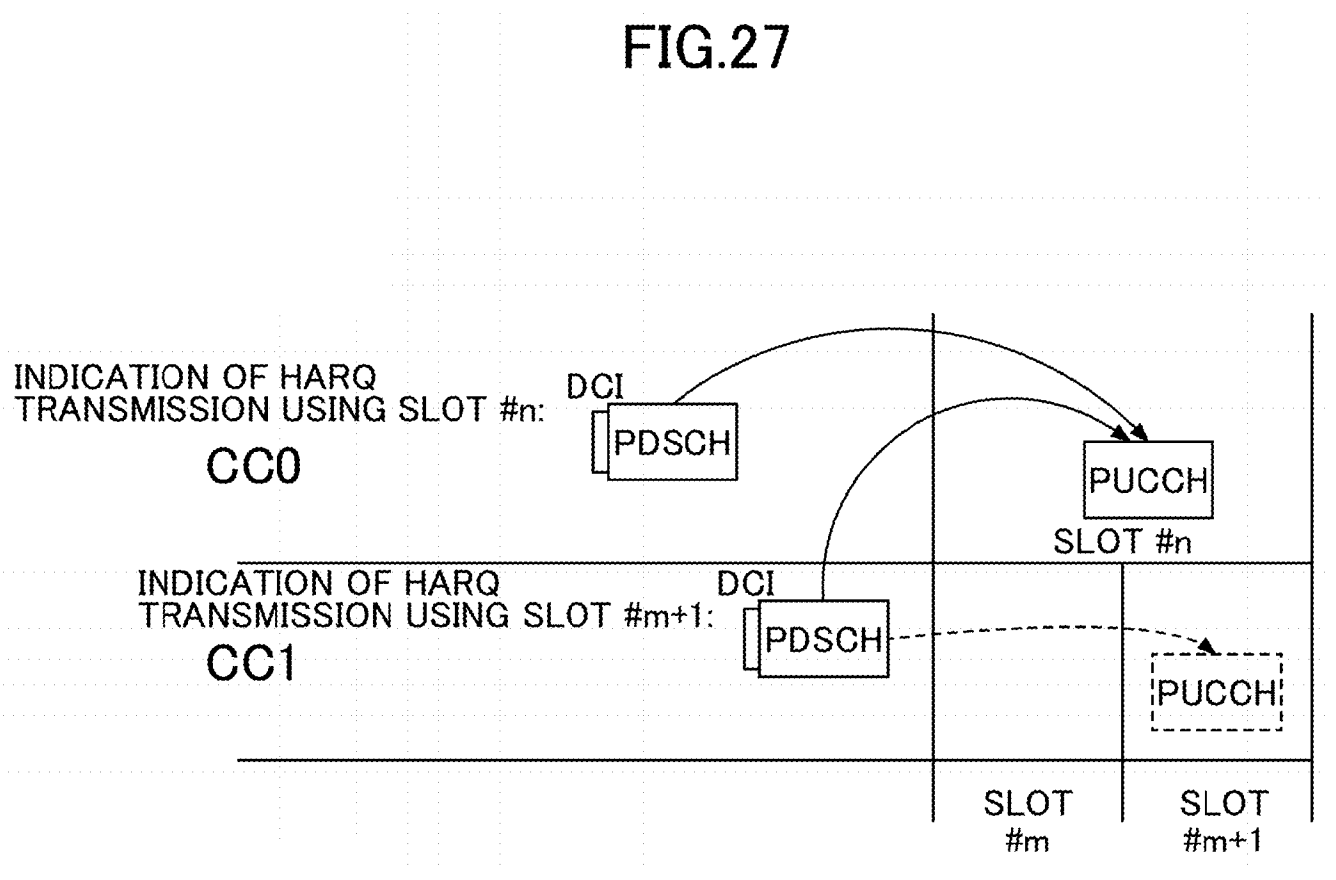

FIG. 27 is a drawing illustrating an example (3) of UCI multiplexing in an embodiment of the present invention. As illustrated in FIG. 27, in a case where SCSs are different between CC0 and CC1, and SCS of the PUCCH transmission CC is smaller, the two UCIs are not transmitted in the same slot. HARQ-ACK transmission using slot #n is indicated in CC0, and HARQ-ACK transmission using slot #m+1 is indicated in CC1. In a case illustrated in FIG. 27, PUCCH is transmitted using slot #n in CC0.

Figure 28:
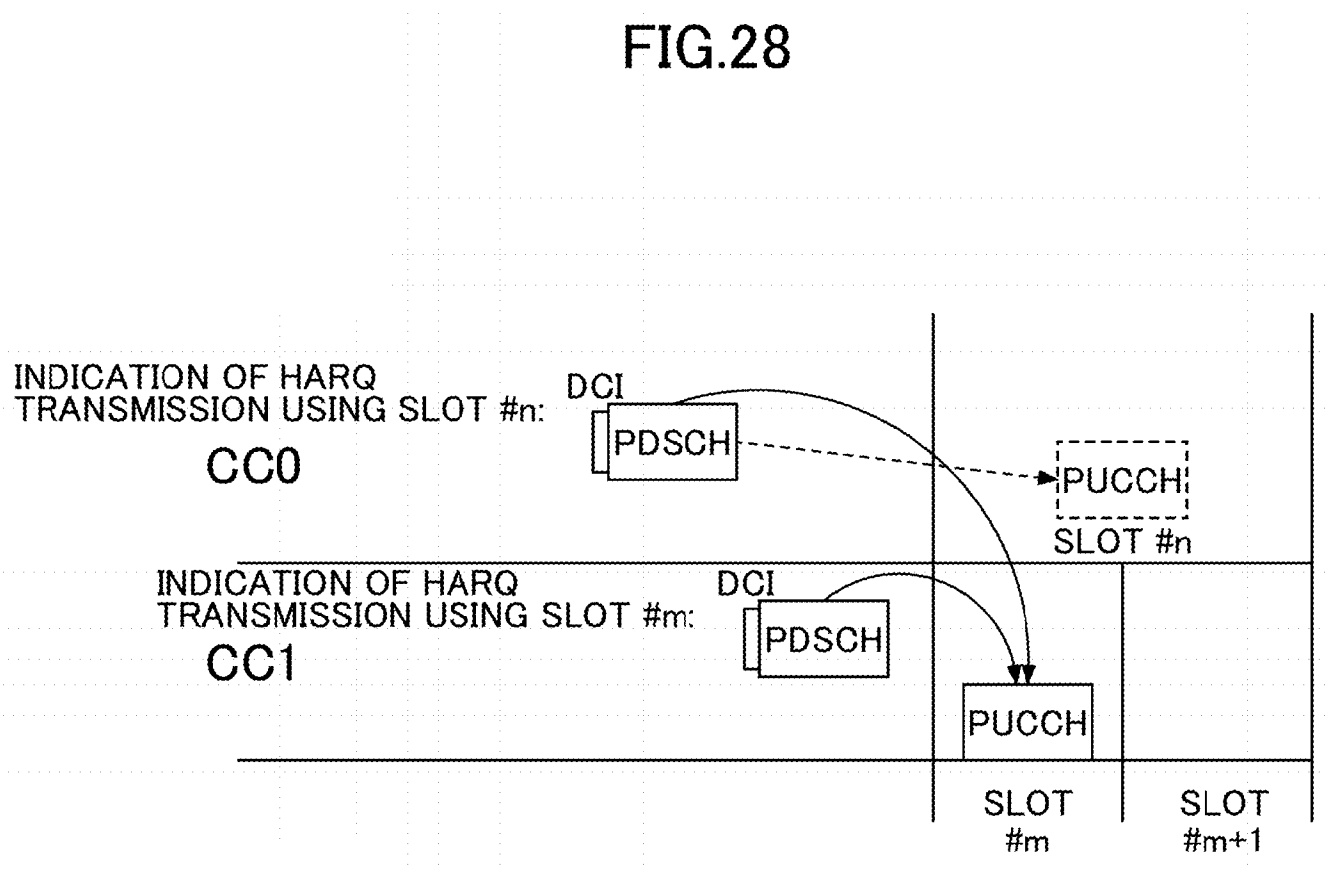

FIG. 28 is a drawing illustrating an example (4) of UCI multiplexing in an embodiment of the present invention. As illustrated in FIG. 28, in a case where SCSs are different between CC0 and CC1, and SCS of the PUCCH transmission CC is larger, the two UCIs are not transmitted in the same slot. HARQ-ACK transmission using slot #n is indicated in CC0, and HARQ-ACK transmission using slot #m is indicated in CC1. In a case illustrated in FIG. 28, PUCCH is transmitted using slot #m in CC1.

Figure 29:
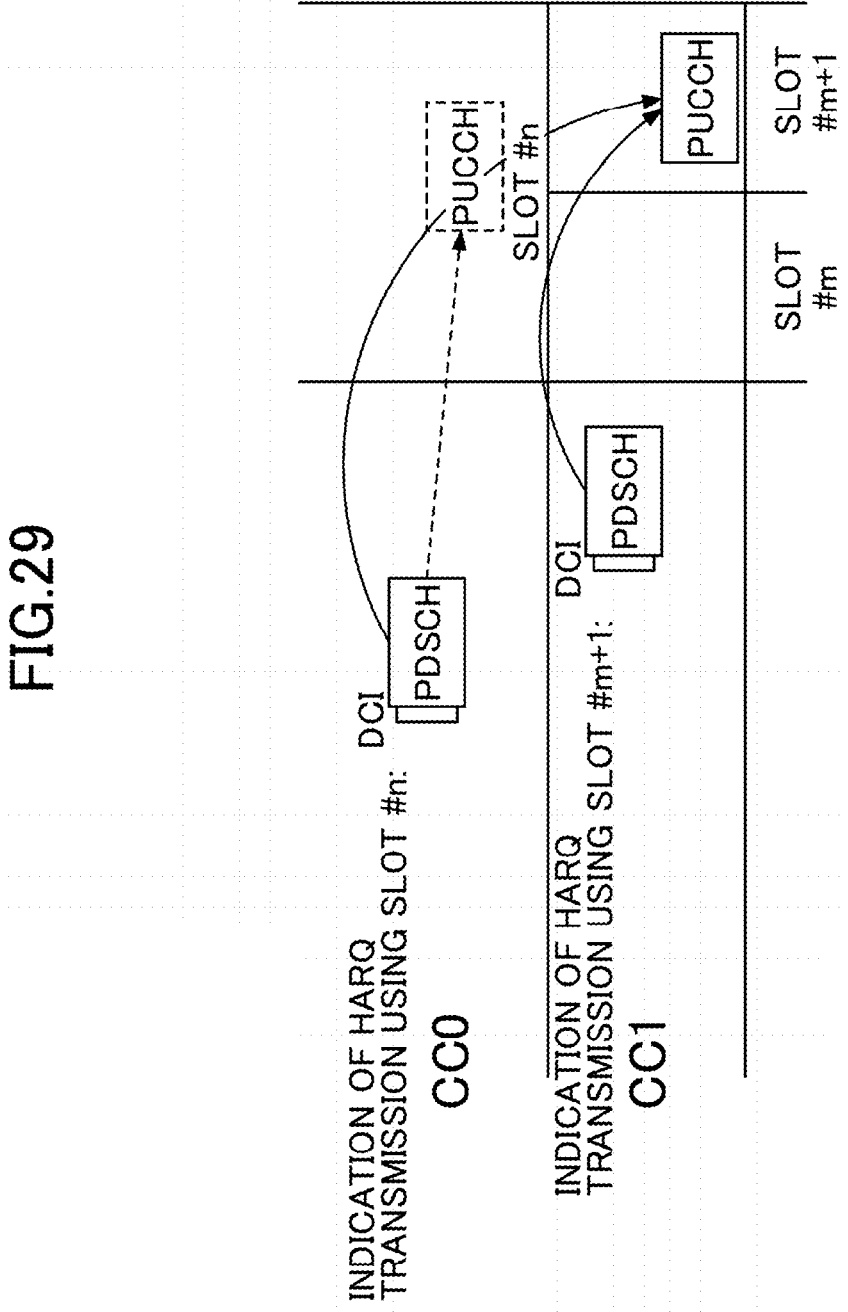
FIG. 29 is a drawing illustrating an example (5) of UCI multiplexing in an embodiment of the present invention.

FIG. 29 is a drawing illustrating an example (5) of UCI multiplexing in an embodiment of the present invention. As illustrated in FIG. 29, in a case where SCSs are different between CC0 and CC1, and SCS of the PUCCH transmission CC is larger, the two UCIs are not transmitted in the same slot. HARQ-ACK transmission using slot #n is indicated in CC0, and HARQ-ACK transmission using slot #m+1 is indicated in CC1. In a case illustrated in FIG. 29, PUCCH is transmitted using slot #m+1 in CC1.

The condition of UCIs to be multiplexed into the same PUCCH resource may be a condition described in 1) to 3) below.

1) In a case where there is an overlap between at least parts of slots or subslots of PUCCH at the time when indicated in each CC. In a case where there is an overlap with respect to at least a part of a slot or a subslot of the PUCCH resource in the CC of PUCCH at the time of indication, UCIs may be multiplexed. In a case where the PUCCH carrier switching occurs, there may be a case in which the CC of PUCCH at the time when the PUCCH resource was indicated in the past is different from the actual PUCCH transmission CC. The terminal 20 may use the SCS and the slot or subslot of the CC of PUCCH at the time when the PUCCH resource was indicated or triggered for determining the condition for UCIs being multiplexed into the same PUCCH resource and for determining the UCI transmission timing.

2) In a case where there is an overlap in at least a part of a slot or subslot of PUCCH at the time of actual transmission. After the PUCCH transmission CC is indicated and the PUCCH transmission CC is determined, that is, after the PUCCH carrier switching is performed, UCIs may be multiplexed in a case where there is an overlap in at least a part of a slot or subslot of the PUCCH transmission CC. In a case where there is no overlap with respect to the slot or subslot of the PUCCH transmission CC, UCIs may be transmitted without multiplexing.

3) In a case where the index values of the slot or subslot of the HARQ feedback timing indicator of the PUCCH resource indicated by respective CCs are the same.

Note that the presence or absence of PUCCH multiplexing is determined according to whether there is an overlap in the PUCCH slot or subslot as described above. The terminal 20 may determine the presence or absence of PUCCH multiplexing according to whether there is at least one symbol overlap in the time domain in the PUCCH resource.

Figure 30:
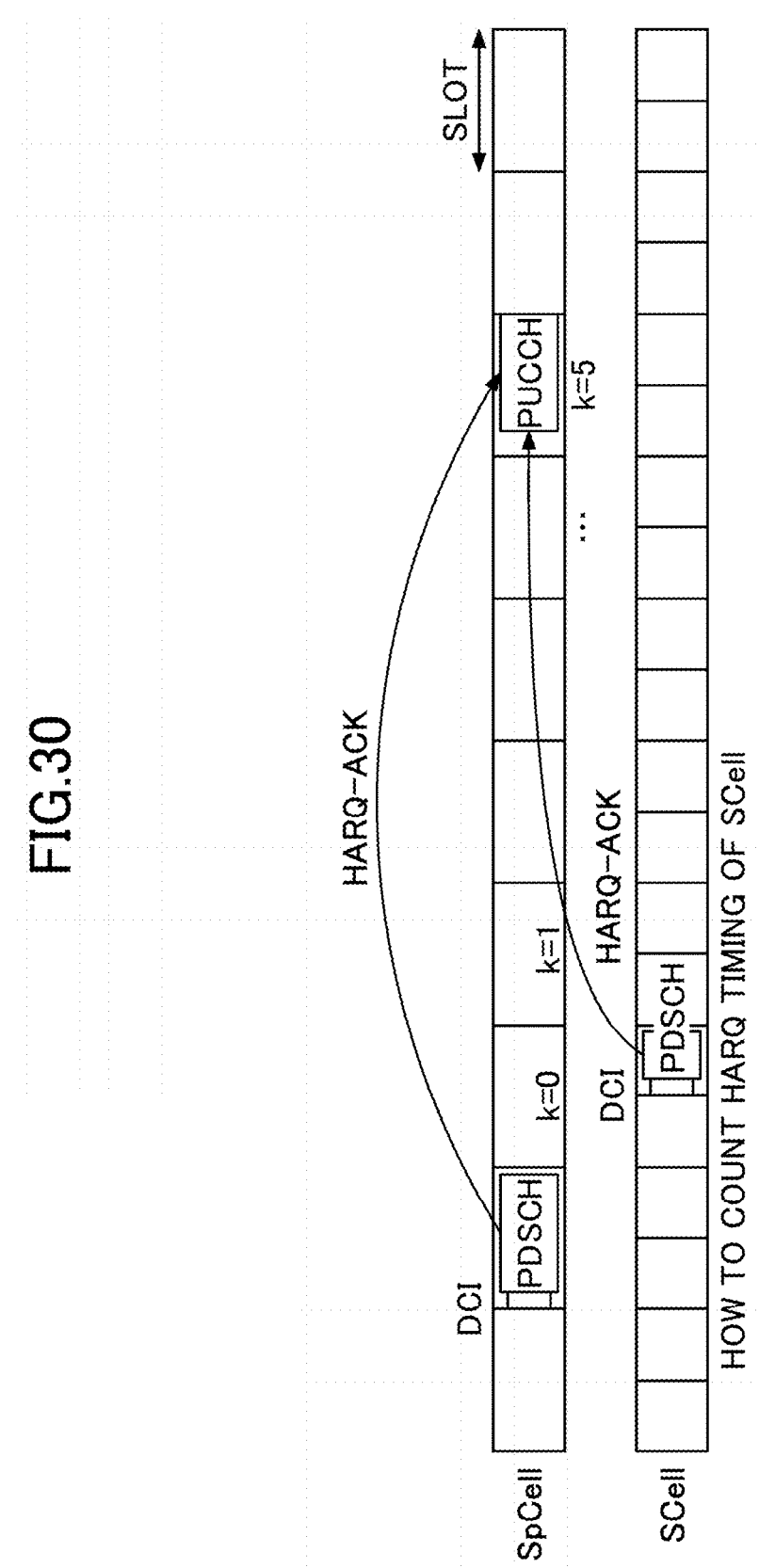
FIG. 30 is a drawing illustrating an example (1) of a HARQ-ACK offset in an embodiment of the present invention.

FIG. 30 is a drawing illustrating an example (1) of a HARQ-ACK offset in an embodiment of the present invention. The timing of HARQ-ACK transmission is indicated by an offset k of the PDSCH reception slot. UCI of each CC is transmitted using one of PCell, PSCell, or PUCCH-SCell, and which CC's UCI is transmitted using which CC's PUCCH is not required to be determined in advance. In other words, the PUCCH transmission CC is not required to be updated using RRC, MAC-CE, or DCI.

As illustrated in FIG. 30, a slot of the PUCCH transmission CC that is the same as the PDSCH reception slot, or a slot of the PUCCH transmission CC that overlaps with the PDSCH reception slot, corresponds to k=0, and the counting may be performed until k becomes k=K1 by using slots of the PUCCH transmission CC. For example, in a case where PUCCH-SCell is not configured and the PUCCH carrier switching is not performed, the k value may be counted by using a slot of SpCell that is the same as the PDSCH reception slot.

For example, in a case where PUCCH-SCell is not configured, all CC's UCI is transmitted using PUCCH of SpCell, and thus, the timing of transmitting all CC's HARQ-ACK may be indicated by an offset of the slot or subslot of HARQ-ACK in SpCell, that is, the PUCCH transmission CC.

For example, the timing of HARQ-ACK for PCell PDSCH scheduled by PCell DCI may be indicated by an offset of the slot or subslot of HARQ-ACK in PCell. In addition, the timing of HARQ-ACK for SCell PDSCH scheduled by SCell DCI may be indicated by an offset of the slot or subslot of HARQ-ACK in PCell.

In the PUCCH carrier switching, the PUCCH transmission CC may be updated using RRC, MAC-CE, and/or DCI. Regarding the counting method or indication method of the HARQ-ACK transmission timing, the HARQ-ACK transmission timing may be indicated as a slot or subslot of one of CCs as described in 1) to 4) below.

1) The slot or subslot may be indicated by the HARQ feedback timing indicator field by assuming that UCI of each CC is transmitted using PUCCH of one of PCell, PSCell, or PUCCH-SCell. For example, when indicating an offset of the slot or subslot by the HARQ feedback timing indicator field, the offset value may be determined without taking into account the PUCCH carrier switching.

Figure 31:
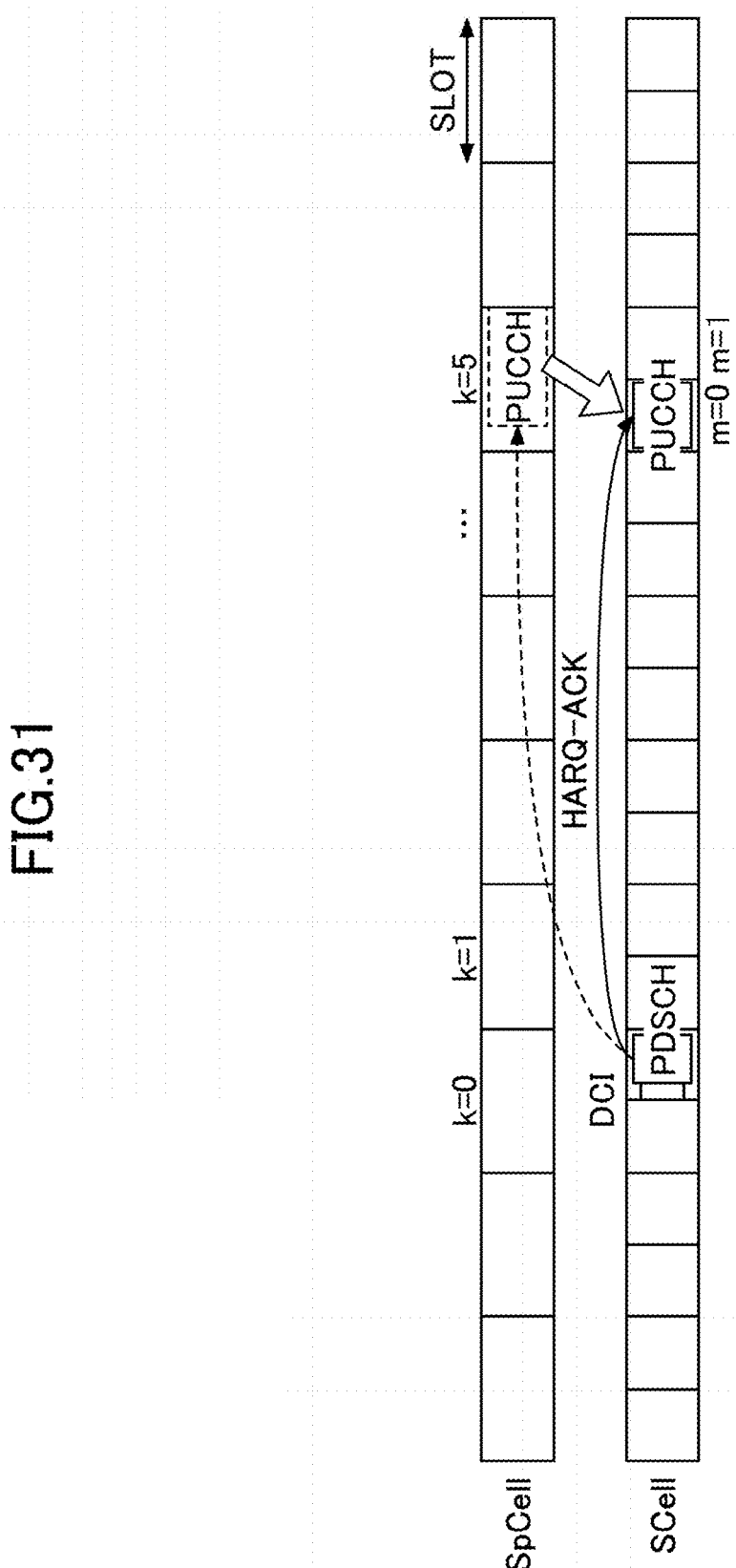
FIG. 31 is a drawing illustrating an example (2) of a HARQ-ACK offset in an embodiment of the present invention.

FIG. 31 is a drawing illustrating an example (2) of a HARQ-ACK offset in an embodiment of the present invention. For example, PUCCH-SCell is not configured, an offset of the slot or subslot for transmitting HARQ-ACK by assuming that PUCCH is transmitted by PCell or PSCell, that is SpCell, in each CC as illustrated in FIG. 31.

Note that, in an example illustrated in FIG. 31, PUCCH is transmitted using a slot of m=0 in SCell having different SCS. PUCCH may be transmitted using a slot of m=1. Which of m=0 or m=1 is to be applied may be specified in the technical specifications, or may be indicated by an upper layer. In a case where a slot for transmitting PUCCH is to be identified by mapping from a CC of larger SCS to a CC of smaller SCS, PUCCH may be transmitted by the terminal 20 by using a slot of the smaller SCS overlapping with at least a part of a slot of the larger SCS. Hereinafter, in a case where SCSs are different between CCs, the slot may be identified in the same way.

In addition, for example, in a case where PUCCH-SCell is configured, with respect to HARQ-ACK of PCell or PSCell, the slot or subslot for transmitting HARQ-ACK may be indicated by assuming that PUCCH is transmitted by using PCell or PSCell. Regarding HARQ-ACK of a CC other than PCell and PSCell, the slot or subslot for transmitting HARQ-ACK may be indicated by assuming that PUCCH is transmitted by using PUCCH-SCell.

Figure 32:
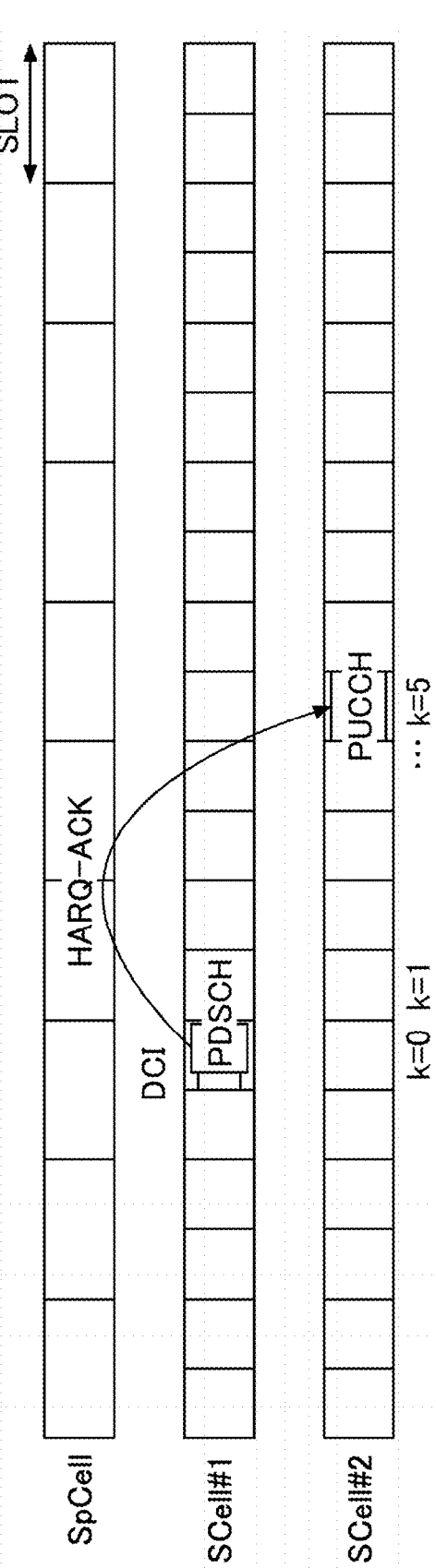
FIG. 32 is a drawing illustrating an example (3) of a HARQ-ACK offset in an embodiment of the present invention.

2) FIG. 32 is a drawing illustrating an example (3) of a HARQ-ACK offset in an embodiment of the present invention. As illustrated in FIG. 32, the slot or subslot for transmitting HARQ-ACK may be indicated by assuming the PUCCH transmission destination CC. The determination method of the PUCCH transmission destination CC may be determined by using a method according to the PUCCH switching in an embodiment of the present invention. In addition, the slot or subslot for transmitting HARQ-ACK may be indicated by assuming the PUCCH transmission destination CC at one of a time point of receiving DCI triggering UCI, a time point of receiving PDSCH, or a time point of transmitting PUCCH. Which time point is to be used may be specified in the technical specifications, or may be configured by an upper layer. The time point may be a time point of the indication using the UE capability report.

Figure 33:
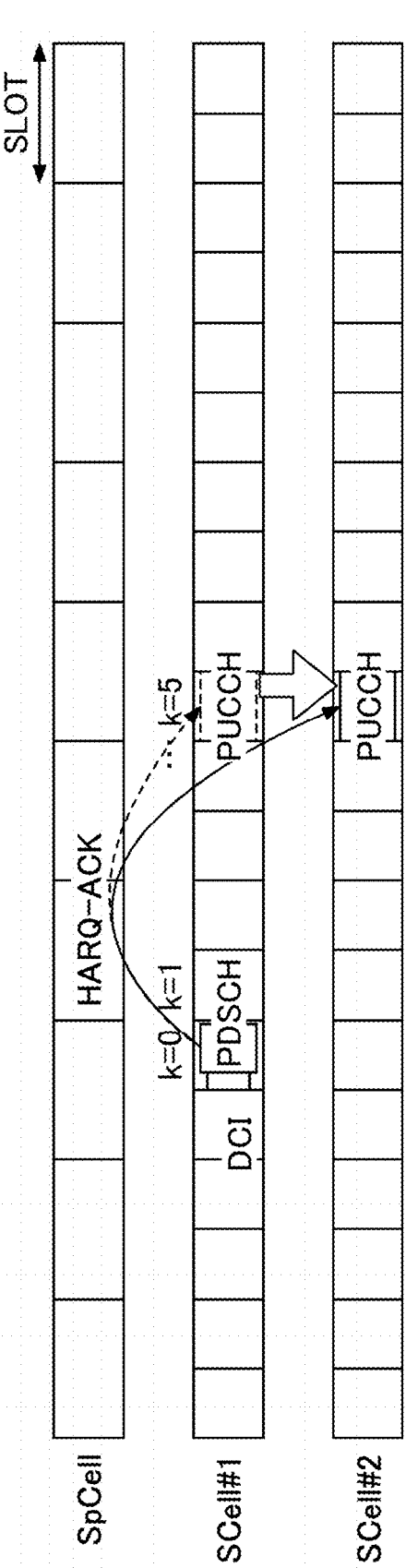
FIG. 33 is a drawing illustrating an example (4) of a HARQ-ACK offset in an embodiment of the present invention.

3) FIG. 33 is a drawing illustrating an example (4) of a HARQ-ACK offset in an embodiment of the present invention. As illustrated in FIG. 33, with respect to UCI of each CC, the slot or subslot for transmitting HARQ-ACK may be indicated by assuming the PDSCH reception CC.

4) The slot or subslot for transmitting HARQ-ACK may be indicated by assuming the CC via which DCI triggering UCI is received.

Figure 34:
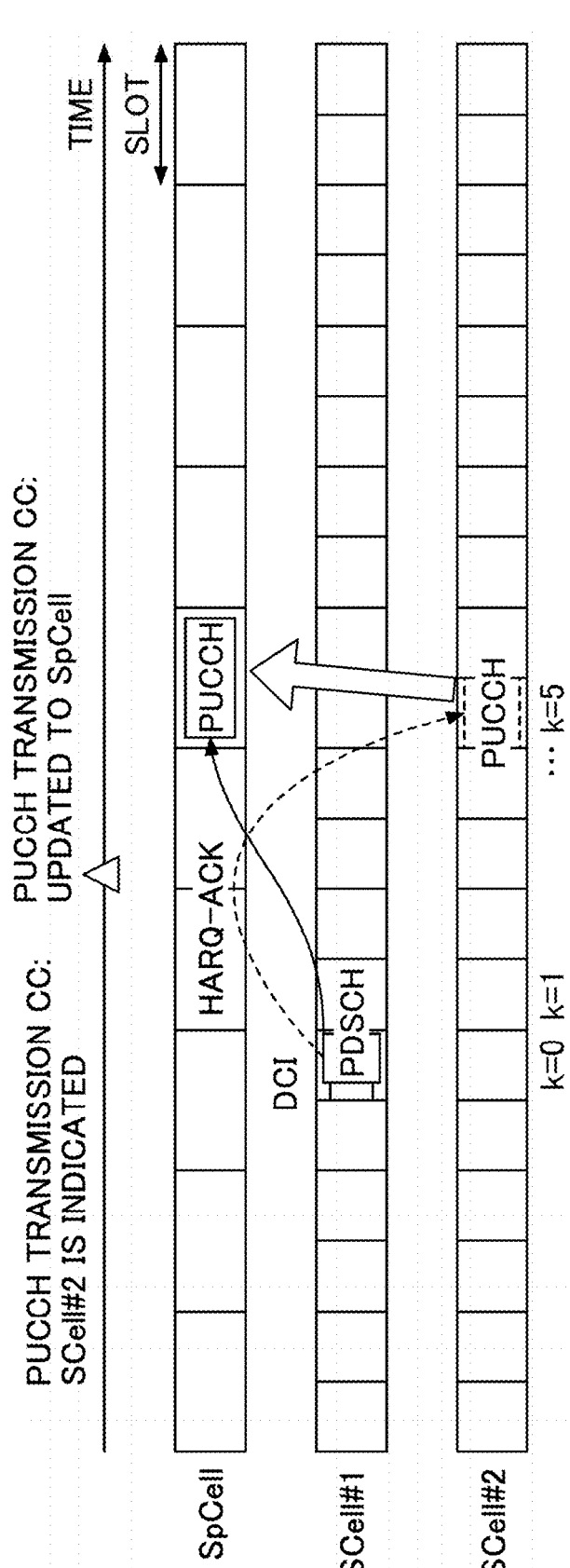
FIG. 34 is a drawing illustrating an example (5) of a HARQ-ACK offset in an embodiment of the present invention.

FIG. 34 is a drawing illustrating an example (5) of a HARQ-ACK offset in an embodiment of the present invention. As illustrated in FIG. 34, the timing of transmitting HARQ-ACK may be determined by assuming PUCCH transmission CC that is supposed to be used for the transmission at the time of DCI reception or at the time of PDSCH reception, and PUCCH may be transmitted by using a slot or subslot that overlaps with the timing. FIG. 34 illustrates an example of the HARQ-ACK transmission timing in a case where the PUCCH transmission CC is updated from SCell #2 to SpCell. The counting of the k value is performed by using slots in SCell #2.

Figure 35:
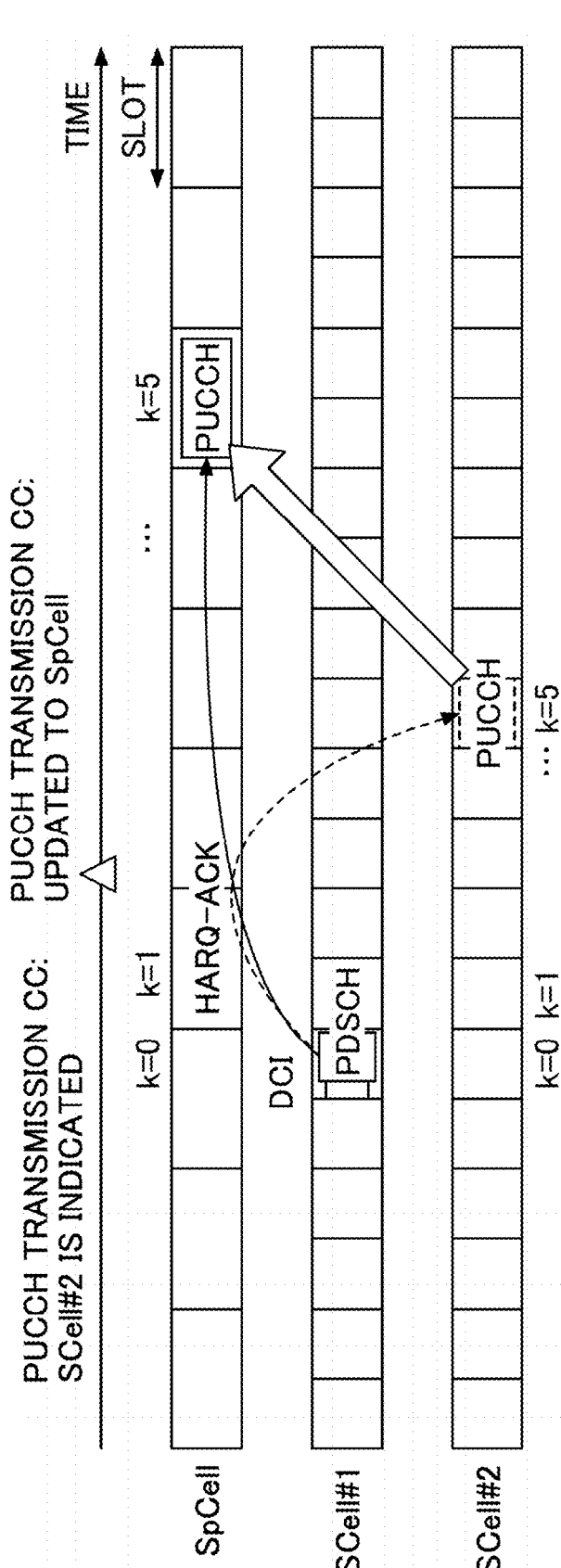
FIG. 35 is a drawing illustrating an example (6) of a HARQ-ACK offset in an embodiment of the present invention.

FIG. 35 is a drawing illustrating an example (6) of a HARQ-ACK offset in an embodiment of the present invention. As illustrated in FIG. 35, the timing of transmitting HARQ-ACK may be determined by assuming the actual PUCCH transmission CC, and PUCCH may be transmitted by using a slot or subslot that overlaps with the timing. FIG. 35 illustrates an example of the HARQ-ACK transmission timing in a case where the PUCCH transmission CC is updated from SCell #2 to SpCell. The counting of the k value is performed by using slots in SpCell.

Here, conventionally, PUCCH-Config is enabled to be configured with respect to SpCell and PUCCH-SCell alone. Therefore, one of the configurations in SpCell and PUCCH-SCell may be applied to a cell of the transition destination of the PUCCH carrier switching.

In addition, by limiting to the terminal 20 for which the PUCCH carrier switching (indication of PUCCH transmission CC using RRC, MAC-CE and/or DCI) is configured, PUCCH-Config may be configured for an SCell other than SpCell and PUCCH-SCell. With respect to the above, the SCell is not required to be limited to an SCell corresponding to a CC included in a CC list that can be a transition destination of the PUCCH carrier switching configured by an upper layer.

Note that, in a case where the PUCCH carrier switching (indication of PUCCH transmission CC using RRC, MAC-CE and/or DCI) is not configured, PUCCH-Config may be configured for up to one additional SCell, or PUCCH-Config may be configured for up to one serving cell for each FR.

According to the above-described embodiment of the present invention, in the terminal 20, the carrier of the transition destination of the PUCCH carrier switching can be flexibly configured. In addition, the PUCCH transmission power control when performing the PUCCH carrier switching will be clarified. In addition, the timing of transmitting HARQ-ACK when performing the PUCCH carrier switching will be clarified even in a case where SCSs are different.

In other words, the configuration related to uplink control channel transmission in a wireless communication system can be clarified.

(Device Configuration) Next, a functional configuration example of the base station 10 and the terminal 20 for performing the processes and operations described above will be described. The base station 10 and terminal 20 include functions for implementing the embodiments described above. It should be noted, however, that each of the base stations 10 and the terminal 20 may include only proposed functions in one of the embodiments.

<Base Station 10>

Figure 36:
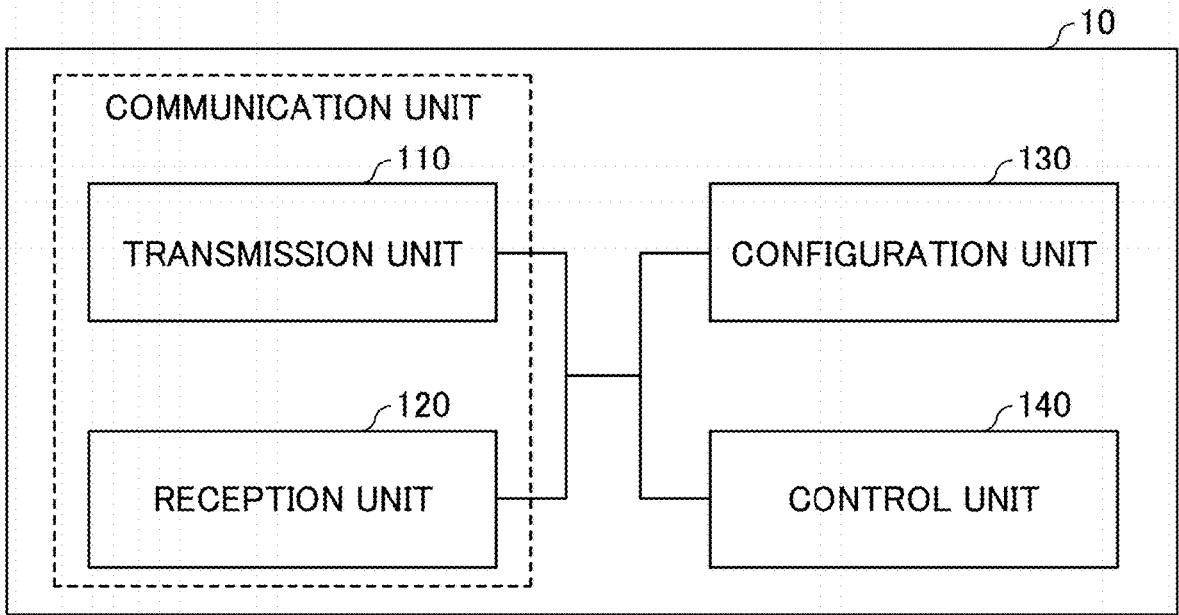
FIG. 36 is a drawing illustrating an example of a functional structure of a base station 10 in an embodiment of the present invention.

FIG. 36 is a diagram illustrating an example of a functional configuration of the base station 10. As shown in FIG. 36, the base station 10 includes a transmission unit 110, a reception unit 120, a configuration unit 130, and a control unit 140. The functional structure illustrated in FIG. 36 is merely an example. Functional divisions and names of functional units may be anything as long as operations according to an embodiment of the present invention can be performed. The transmission unit 110 and the reception unit 120 may be referred to as a communication unit.

The transmission unit 110 includes a function for generating a signal to be transmitted to the terminal 20 side and transmitting the signal wirelessly. The reception unit 120 includes a function for receiving various signals transmitted from the terminal 20 and acquiring, for example, information of a higher layer from the received signals. Further, the transmission unit 110 has a function of transmitting NR-PSS, NR-SSS, NR-PBCH, DL/UL control signals, the DL data, and the like, to the terminal 20. In addition, the transmission unit 110 transmits configuration information, or the like, described in the embodiment.

The configuration unit 130 stores preset configuration information and various configuration information items to be transmitted to the terminal 20 in a storage apparatus and reads the preset configuration information from the storage apparatus if necessary. The control unit 140 controls the entire base station 10 including, for example, control of signal transmission and reception. Note the functional unit related to signal transmission in the control unit 140 may be included in the transmission unit 110, and the functional unit related to signal reception in the control unit 140 may be included in the reception unit 120. Further, the transmission unit 110 and the reception unit 120 may be referred to as a transmitter and a receiver, respectively.

<Terminal 20>

Figure 37:
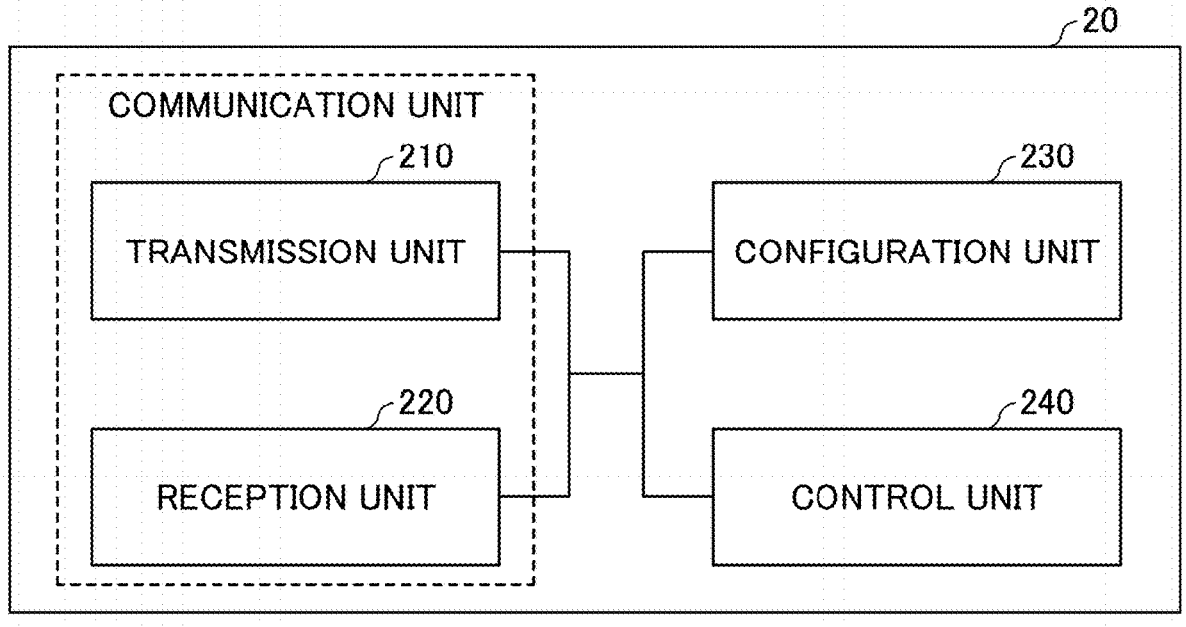
FIG. 37 is a drawing illustrating an example of a functional structure of a terminal 20 in an embodiment of the present invention.

FIG. 37 is a diagram illustrating an example of a functional configuration of the terminal 20. As shown in FIG. 37, the terminal 20 includes a transmission unit 210, a reception unit 220, a configuration unit 230, and a control unit 240. The functional structure illustrated in FIG. 37 is merely an example. Functional divisions and names of functional units may be anything as long as operations according to an embodiment of the present invention can be performed. The transmission unit 210 and the reception unit 220 may be referred to as a communication unit.

The transmission unit 210 generates a transmission signal from transmission data and transmits the transmission signal wirelessly. The reception unit 220 receives various signals wirelessly and obtains upper layer signals from the received physical layer signals. In addition, the transmission unit 210 transmits a HARQ-ACK, and the reception unit 220 receives configuration information described in the embodiment.

The configuration unit 230 stores, in a storage device, various configuration information items received from the base station 10 via the reception unit 220, and reads them from the storage device if necessary. In addition, the configuration unit 230 also stores pre-configured configuration information. The control unit 240 controls the entire terminal 20 including control related to signal transmission and reception. Note the functional unit related to signal transmission in the control unit 240 may be included in the transmission unit 210, and the functional unit related to signal reception in the control unit 240 may be included in the reception unit 220. Further, the transmission unit 210 and the reception unit 220 may be referred to as a transmitter and a receiver, respectively.

(Hardware Structure) In the above functional structure diagrams used for describing an embodiment of the present invention (FIG. 36 and FIG. 37), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 38:
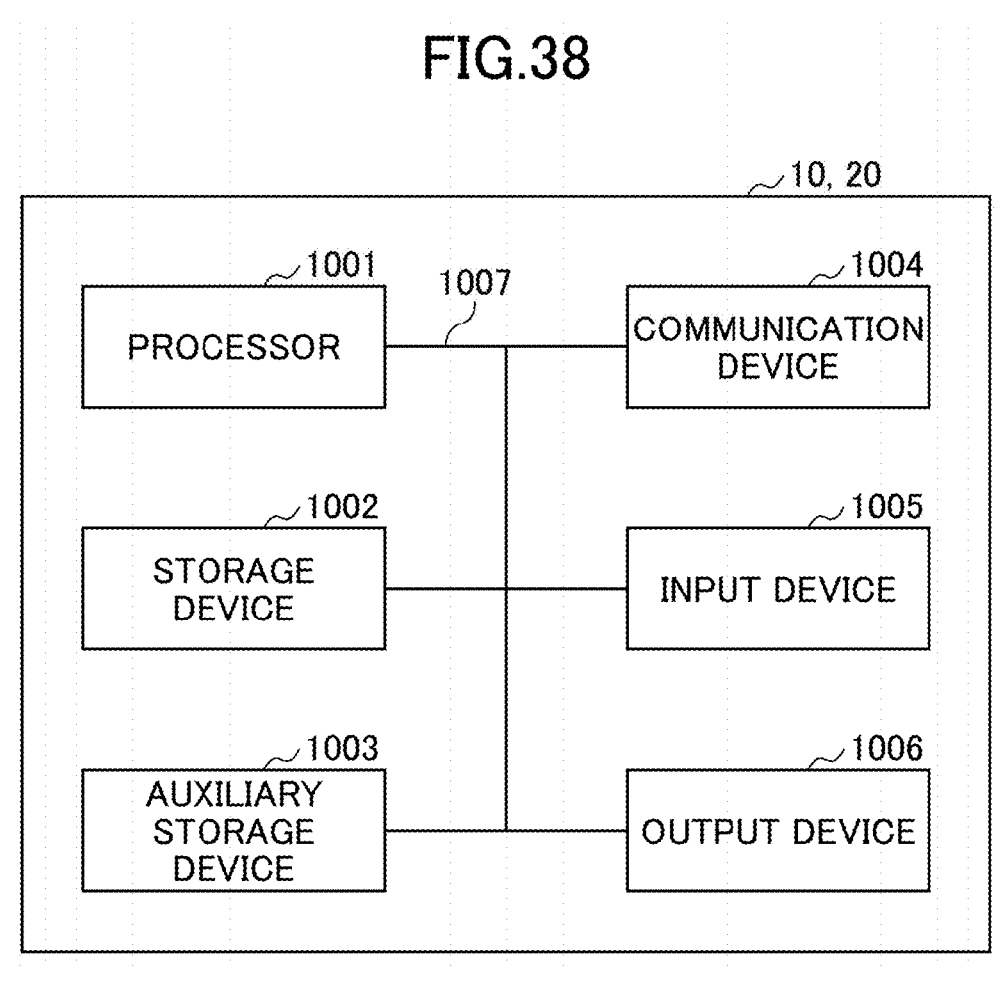
FIG. 38 is a drawing illustrating an example of a hardware structure of the base station 10 or the terminal 20 in an embodiment of the present invention.

For example, the base station 10, terminal 20, etc., according to an embodiment of the present disclosure may function as a computer for processing the radio communication method of the present disclosure. FIG. 38 is a drawing illustrating an example of hardware structures of the base station 10 and terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and terminal 20 may include one or more of each of the devices illustrated in the figure, or may not include some devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads out onto the storage device 1002 a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 36 may be realized by control programs that are stored in the storage device 1002 and are executed by the processor 1001. Further, for example, the control unit 240 of the terminal 20 illustrated in FIG. 37 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disc, digital versatile disc, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission and reception device) for communicating with computers via at least one of a wired network and a wireless network, and may be referred to as a network device, a network controller, a network card, a communication module, etc. The communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station 10 and terminal 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, a terminal is provided. The terminal includes: a reception unit configured to receive control information and data from a base station; a control unit configured to determine a carrier for transmitting an uplink control channel, based on the control information; and a transmission unit configured to transmit information related to retransmission control of the data in the determined carrier. The control unit configures an activation timing and a deactivation timing of the determined carrier.

According to the above configuration, in the terminal 20, the carrier of the transition destination of the PUCCH carrier switching can be flexibly configured. In other words, the flexibility of configuration related to uplink control channel transmission in a wireless communication system can be improved.

The control unit may configure the activation timing and the deactivation timing, based on a timing at which the transmission unit transmits a response to the control information to the base station. According to the above-described configuration, in the terminal 20, the execution timing of the PUCCH carrier switching can be clarified.

The transmission unit may transmit information related to retransmission control of the data to the base station via the uplink control channel by using a power control parameter that is applied to a carrier indicated by the control information. According to the above-described configuration, in the terminal 20, the PUCCH transmission power control at the time of performing the PUCCH carrier switching can be clarified.

In a case where the carrier for transmitting the uplink control channel is indicated by the control information, the control unit may reset an accumulated value of a TPC (Transmission Power Control) command that is applied to the uplink control channel. According to the above-described configuration, in the terminal 20, the PUCCH transmission power control at the time of performing the PUCCH carrier switching can be clarified.

In a case where the carrier for transmitting the uplink control channel is indicated by the control information, the control unit may switch a closed loop power control parameter related to a spatial relation that is applied to the uplink control channel. According to the above-described configuration, in the terminal 20, the PUCCH transmission power control at the time of performing the PUCCH carrier switching can be clarified.

In addition, according to an embodiment of the present invention, a communication method performed by a terminal is provided. The communication method includes: receiving control information and data from a base station; a control unit configured to determine a carrier for transmitting an uplink control channel, based on the control information; transmitting information related to retransmission control of the data communication method performed by a in the determined carrier; and configuring an activation timing and a deactivation timing of the determined carrier.

According to the above configuration, in the terminal 20, the timing of performing the PUCCH carrier switching can be clarified. In other words, the configuration related to uplink control channel transmission in a wireless communication system can be clarified.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may be represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases "up" and "down" may also be replaced by the phrases corresponding to terminal-to-terminal communication (e.g., "side"). For example, an uplink channel, a downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming", "expecting", or "considering", etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "based on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts", "circuits", "devices", etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.) may be replaced with a TTI having a time length exceeding 1 ms, and the short TTI (e.g., shortened TTI, etc.) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in an RB may be the same, regardless of the numerology, and may be 12, for example. The number of subcarriers included in an RB may be determined on the basis of numerology.

Further, the time domain of an RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), sub-carrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a terminal 20, one or more BWPs may be configured in one carrier.

At least one of the configured BWPs may be activated, and the terminal 20 may assume that the terminal 20 will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in an RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

Each aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
30 Core network
1001 Processor
1002 Storage device
1003 Auxiliary storage device
1004 Communication device
1005 Input device
1006 Output device

The invention claimed is:

1. A terminal comprising:
a reception unit configured to receive RRC (Radio Resource Control) signaling and a PDSCH (Physical Downlink Shared Channel) from a base station, the RRC signaling specifying a cell as a transmission destination cell of a PUCCH (Physical Uplink Control Channel), the cell being different from a primary cell and a subcarrier spacing (SCS) of the cell being different from an SCS of the primary cell;
a control unit configured to determine the cell that is different from the primary cell as a transmission destination cell of the PUCCH, based on the RRC signaling; and
a transmission unit configured to transmit information related to retransmission control corresponding to the PDSCH to the base station in the transmission destination cell of the PUCCH,
wherein the control unit stores an accumulated value of closed loop power control for each cell in transmission power control in the transmission destination cell of the PUCCH, and
wherein in a case where a plurality of cells can be used as a transmission destination cell of the PUCCH, a priority order between the plurality of the cells is specified in advance.

2. The terminal as claimed in claim 1, wherein the transmission unit transmits, to the base station, a terminal capability indicating whether or not PUCCH cell switching according to the RRC signaling is supported.

3. A communication system comprising: a terminal; and a base station, wherein
the terminal includes:
a reception unit configured to receive RRC (Radio Resource Control) signaling and a PDSCH (Physical Downlink Shared Channel) from a base station, the RRC signaling specifying a cell as a transmission destination cell of a PUCCH (Physical Uplink Control Channel), the cell being different from a primary cell and a subcarrier spacing (SCS) of the cell being different from an SCS of the primary cell;

a control unit configured to determine the cell that is
different from the primary cell as a transmission
destination cell of the PUCCH, based on the RRC
signaling; and a transmission unit configured to transmit information
related to retransmission control corresponding to
the PDSCH to the base station in the transmission
destination cell of the PUCCH, wherein the control unit stores an accumulated value of
closed loop power control for each cell in transmis-
sion power control in the transmission destination
cell of the PUCCH, and wherein in a case where a plurality of cells can be used
as a transmission destination cell of the PUCCH, a
priority order between the plurality of the cells is
specified in advance, and the base station includes:

a transmission unit configured to transmit the RRC
signaling and the PDSCH to the terminal;

a control unit configured to assume that the cell that is
different from the primary cell is to be a transmission
destination cell of the PUCCH, based on the RRC
signaling; and a reception unit configured to receive information
related to retransmission control corresponding to the PDSCH in the transmission destination cell of the
PUCCH from the terminal.

4. A communication method performed by a terminal, the
communication method comprising:

receiving RRC (Radio Resource Control) signaling and a
PDSCH (Physical Downlink Shared Channel) from a
base station, the RRC signaling specifying a cell as a
transmission destination cell of a PUCCH (Physical
Uplink Control Channel), the cell being different from
a primary cell and a subcarrier spacing (SCS) of the cell
being different from an SCS of the primary cell;

determining the cell that is different from the primary cell
as a transmission destination cell of the PUCCH, based
on the RRC signaling;

transmitting information related to retransmission control
corresponding to the PDSCH to the base station in the
transmission destination cell of the PUCCH; and storing an accumulated value of closed loop power con-
trol for each cell in transmission power control in the
transmission destination cell of the PUCCH, wherein in a case where a plurality of cells can be used as
a transmission destination cell of the PUCCH, a prior-
ity order between the plurality of the cells is specified
in advance.

* * * * *